US008326143B2

(12) United States Patent
Sato et al.

(10) Patent No.: US 8,326,143 B2
(45) Date of Patent: Dec. 4, 2012

(54) ROUTING METHOD OF OPTICAL COMMUNICATION NETWORK NODE APPARATUS AND OPTICAL COMMUNICATION NETWORK NODE APPARATUS

(75) Inventors: Ken-ichi Sato, Nagoya (JP); Hiroshi Hasegawa, Nagoya (JP); Kiyo Ishii, Nagoya (JP)

(73) Assignee: National University Corporation Nagoya University, Nagoya (JP)

( * ) Notice: Subject to any disclaimer, the term of this patent is extended or adjusted under 35 U.S.C. 154(b) by 291 days.

(21) Appl. No.: 12/733,070

(22) PCT Filed: Mar. 6, 2008

(86) PCT No.: PCT/JP2008/054076
§ 371 (c)(1),
(2), (4) Date: Apr. 19, 2010

(87) PCT Pub. No.: WO2009/022478
PCT Pub. Date: Feb. 19, 2009

(65) Prior Publication Data
US 2010/0215366 A1 Aug. 26, 2010

(30) Foreign Application Priority Data
Aug. 11, 2007 (JP) .................................. 2007-210576

(51) Int. Cl.
*H04B 10/00* (2006.01)
*H04B 10/20* (2006.01)
*H04J 14/02* (2006.01)
(52) U.S. Cl. .......... 398/3; 398/4; 398/5; 398/59; 398/83
(58) Field of Classification Search .............. 398/1, 3–5, 398/7, 58, 59, 82, 83
See application file for complete search history.

(56) References Cited

U.S. PATENT DOCUMENTS
6,226,111 B1 * 5/2001 Chang et al. ..................... 398/9
(Continued)

FOREIGN PATENT DOCUMENTS
JP   A-2001-308794   11/2001
(Continued)

OTHER PUBLICATIONS
Sato, "Broadband Optical Networking Technology," *Institute of Electronics. Information and Communication Engineers*, 2003.
Kakehashi, S. et al., "Optical Switch Architecture for Hierarchial Optical Path Networks," *IEICE Technical Report*, Aug. 2006, pp. 9-12.
(Continued)

*Primary Examiner* — Dalzid Singh
(74) *Attorney, Agent, or Firm* — Oliff & Berridge, PLC

(57) ABSTRACT

An optical communication network node apparatus is provided that considerably reduces the node apparatus in scale, especially, a switch device in scale relative to increase in the number of wavelength multiplexes. With a routing operation on the basis of a wavelength at an intra-ring traffic step, light output from a plurality of demultiplexers is subjected to add/drop and routing processes and is directly or indirectly distributed to a plurality of multiplexers, and at an inter-ring traffic step (including a routing operation on the basis of a wavelength group), among lights output from a plurality of demultiplexers, light of another wavelength preliminarily set for inter-ring transmission and different from the light of the wavelength preliminarily set for the intra-ring transmission is subjected to the routing process, and, therefore, the node apparatus is considerably reduced to a smaller scale as compared to a node apparatus that achieves concatenation in a manner capable of routing lights of all the wavelengths to arbitrary optical rings.

2 Claims, 9 Drawing Sheets

U.S. PATENT DOCUMENTS

| | | | |
|---|---|---|---|
| 6,616,349 B1 * | 9/2003 | Li et al. ............................... | 398/4 |
| 7,142,745 B1 * | 11/2006 | Hamilton-Gahart ............ | 385/24 |
| 7,200,332 B2 * | 4/2007 | Gumaste et al. ................. | 398/59 |
| 8,090,256 B2 * | 1/2012 | Reisslein et al. .................. | 398/3 |
| 2001/0040710 A1 | 11/2001 | Sharratt et al. | |
| 2002/0131677 A1 | 9/2002 | Doerr | |
| 2005/0196169 A1 | 9/2005 | Tian et al. | |

FOREIGN PATENT DOCUMENTS

| | | |
|---|---|---|
| JP | A-2002-330107 | 11/2002 |
| JP | A-2003-324452 | 11/2003 |
| JP | A-2005-253084 | 9/2005 |

OTHER PUBLICATIONS

Ishii, K. et al., "Wavelength Assignment for Concatenated ROADM Ring Networks and Simple Node Architecture," *IEICE Technical Report*, Jun. 7, 2007, vol. 107, No. 90.

Ishii, K. et al., "An Architecture of OADM Ring Connecting Nodes with Waveband Paths Routing," *Proceedings of the 2007 IEICE General Conference*, Mar. 20, 2007.

International Search Report issued in International Application No. PCT/JP2008/054076 on May 1, 2008.

Jun. 5, 2012 Office Action issued in Japanese Application No. 2009-528043 (with translation).

* cited by examiner

FIG.9

| TRAFFIC TYPE | | \multicolumn{5}{c|}{INTER-RING TRAFFIC} | INTRA-RING TRAFFIC |
|---|---|---|---|---|---|---|---|
| | | 1 | 2 | | 3 | 4 | |
| WAVELENGTH | | $\lambda_1 \cdots \lambda_W$ | $\lambda_{W+1} \cdots \lambda_{2W}$ | $\lambda_{2W+1} \cdots \lambda_{(i-1)W+1} \cdots \lambda_{iW}$ | $\cdots \lambda_{(K-1)W}$ | $\lambda_{(K-1)W+1} \cdots \lambda_{KW}$ | $\lambda_{KW+1} \cdots \lambda_L$ |
| FIRST RING R1 | CLOCKWISE | W | P | | W | P | W | P |
| | COUNTER-CLOCKWISE | P | W | | P | W | P | W |
| SECOND RING R2 | CLOCKWISE | W | P | | W | W | W | P |
| | COUNTER-CLOCKWISE | P | W | | P | P | P | W |
| | | WB₁ | WB₂ | WBᵢ | | WBₖ | |

ROUTING METHOD OF OPTICAL COMMUNICATION NETWORK NODE APPARATUS AND OPTICAL COMMUNICATION NETWORK NODE APPARATUS

TECHNICAL FIELD

The present invention relates to a routing method of an optical communication network node apparatus and the optical communication network node apparatus for intra-optical-ring routing and inter-optical-ring routing of wavelength multiplexed light in connection of two or a plurality of optical rings within an optical network.

BACKGROUND ART

An optical communication network is known that is made up of N rings including first and second bidirectional optical rings each having at least two annular optical fibers. The optical communication network is provided with an optical communication node apparatus that sets transmission paths of respective wavelengths making up wavelength multiplexed light including a plurality of wavelengths within each optical ring and between respective optical rings in the N rings. For example, this corresponds to the optical communication network described in Nonpatent Literature 1.

A technique has been proposed to constrain the scale of nodes performing the cross connect of the wavelength multiplexed light by performing routing (path setting) on the basis of a waveband (band) including a predetermined number of wavelengths in the optical communication network. For example, this corresponds to the technique described in Nonpatent Literature 2.

Nonpatent Literature 1: Sato, "Broadband Optical Networking Technology", Institute of Electronics, Information and Communication Engineers, 2003

Nonpatent Literature 2: Kakehashi, Hasegawa, and Sato, IEICE Technical Report, PN2006-12, August 2006

DISCLOSURE OF THE INVENTION

Problems To Be Solved By the Invention

Since a node apparatus mutually connecting concatenated optical rings of an optical communication network transmitting the wavelength multiplexed light requires a fiber selecting function and is configured as optical cross connection, connection nodes are increased in scale at an accelerated rate relative to the number of wavelength multiplexes and forms a bottleneck for increasing the number of multiplexes. For example, if first and second bidirectional optical rings are concatenated by a single node apparatus in a manner capable of arbitrarily routing all the wavelengths as depicted in FIG. 12, a set of 36 switch elements is formed with four inputs and two add inputs corresponding to each light of respective wavelengths multiplexed in four optical fibers and four outputs and two drop outputs to four optical fibers and is required by the number of wavelength multiplexes. If the number L of wavelength multiplexes is 96, a switch device depicted in FIG. 13 is required by the number of wavelengths and, as depicted by ◇ marks of FIG. 7, a switch device including a total of 3467 switch elements is required.

Therefore, since the node apparatus is increased in scale and becomes expensive, an obstacle bottleneck for increasing the number of multiplexes is formed in the wavelength multiplexed optical communication including inter-ring connection. The same applies to the case of performing the routing on the basis of the waveband (band) instead of wavelength.

The present invention was conceived in view of the situations and it is therefore the object of the present invention to provide an optical communication network node apparatus that considerably reduces the node apparatus in scale, especially, a switch device in scale relative to increase in the number of wavelength multiplexes.

As a result of various considerations in view of the situations, the inventor conceives that the number of the switch elements may be reduced to ½ or less if processes of intra-ring traffic and inter-ring traffic are separated in the routing of a node apparatus mutually concatenating optical rings in a network including a plurality of rings. The present invention was conceived based on such knowledge.

Means For Solving the Problems

The object indicated above is achieved by the invention according to claim 1, which provides a routing method of an optical communication network node apparatus in an optical communication network (a) containing a concatenated ring network including a first optical ring and a second optical ring each having at least two annular optical fibers, the optical communication network node apparatus including a plurality of demultiplexers that demultiplex for each wavelength or each wavelength group and respectively output wavelength multiplexed lights respectively input from the pairs of the annular optical fibers and a plurality of multiplexers that multiplex lights respectively input for transmission to the pairs of the annular optical fibers to respectively output the multiplexed wavelength multiplexed lights to the pairs of the annular optical fibers, the optical communication network node apparatus achieving connection within the first optical ring or the second optical ring and between the first optical ring and the second optical ring for the transmission of the wavelength multiplexed lights, the method including: (b) an intra-ring traffic step of performing a routing process of light of wavelength preliminarily set for intra-ring transmission among the lights output from the plurality of the demultiplexers to directly or indirectly distribute the light to the multiplexers performing output to the optical fibers in the ring that has transmitted the light among the plurality of the multiplexers; and (c) an inter-ring traffic step of performing a routing process of light of another wavelength preliminarily set for the inter-ring transmission and different from the light of wavelength preliminarily set for the intra-ring transmission among the lights output from the plurality of the demultiplexers to directly or indirectly distribute the light to the plurality of the multiplexers.

The object indicated above is achieved by the invention according to claim 2, which provides an optical communication network node apparatus in an optical communication network (a) containing a concatenated ring network including a first optical ring and a second optical ring each having at least two annular optical fibers, the optical communication network node apparatus achieving connection within the first optical ring or the second optical ring and between the first optical ring and the second optical ring for transmission of wavelength multiplexed lights, the apparatus including: (b) a plurality of demultiplexers that demultiplex for each wavelength or for each wavelength group and respectively output the wavelength multiplexed lights respectively input from the pairs of the annular optical fibers; (c) a plurality of multiplexers that multiplex lights of wavelengths respectively input for transmission to the pairs of the annular optical fibers to respectively output the lights to the pairs of the annular optical fibers; (d) a plurality of intra-ring traffic switch devices that respectively distribute light of wavelength preliminarily set for the intra-ring transmission among the lights of respective wavelengths or respective wavelength groups output from the plurality of the demultiplexers to the multiplexers performing output to the optical ring that has transmitted the light among the plurality of the multiplexers; and (e) a plurality of inter-ring traffic switch devices provided between the plurality of the demultiplexers and the plurality of the multiplexers to respectively distribute to the plurality of the multiplexers the light of another wavelength preliminarily set for the inter-ring transmission and different from the light of wavelength preliminarily set for the intra-ring transmission among the lights of respective wavelengths or respective wavelength groups respectively output from the demultiplexers.

The object indicated above is achieved by the invention according to claim 3, which provides an optical communication network node apparatus in an optical communication network (a) containing a concatenated ring network including a first optical ring and a second optical ring each having at least two annular optical fibers, the optical communication network node apparatus achieving connection within the first optical ring or the second optical ring and between the first optical ring and the second optical ring for transmission of wavelength multiplexed lights, the apparatus including: (b) a plurality of wavelength demultiplexers that demultiplex for each wavelength and respectively output the wavelength multiplexed lights respectively input from the pairs of the annular optical fibers; (c) a plurality of wavelength multiplexers that multiplex lights of wavelengths respectively input for transmission to the pairs of the annular optical fibers to respectively output the lights to the pairs of the annular optical fibers; (d) a first intra-ring traffic switch device provided between a pair of first wavelength demultiplexers receiving input from the annular optical fibers making up the first optical ring among the plurality of the wavelength demultiplexers and a pair of first wavelength multiplexers performing output to the annular optical fibers making up the first optical ring among the plurality of the wavelength multiplexers to respectively distribute to the pair of the first wavelength multiplexers the light of wavelength preliminarily set for the intra-ring transmission among the lights of respective wavelengths output from the first wavelength demultiplexers; (e) a second intra-ring traffic switch device provided between a pair of second wavelength demultiplexers receiving input from the annular optical fibers making up the second optical ring among the plurality of the wavelength demultiplexers and a pair of second wavelength multiplexers performing output to the annular optical fibers making up the second optical ring among the plurality of the wavelength multiplexers to branch/insert as needed and respectively distribute to the pair of the second wavelength multiplexers the light of wavelength preliminarily set for the intra-ring transmission among the lights of respective wavelengths output from the second wavelength demultiplexers; and (f) a plurality of inter-ring traffic switch devices provided between the plurality of the wavelength demultiplexers and the plurality of the wavelength multiplexers to respectively distribute to the plurality of the wavelength multiplexers the light of another wavelength preliminarily set for the inter-ring transmission and different from the light of wavelength preliminarily set for the intra-ring transmission among the lights of respective wavelengths respectively output from the wavelength demultiplexers.

The object indicated above is achieved by the invention according to claim 4, which provides an optical communication network node apparatus in an optical communication network (a) including a first optical ring and a second optical ring each having at least two annular optical fibers, the optical communication network node apparatus setting a transmission path of wavelength multiplexed light including a plurality of wavelengths within the first optical ring or the second optical ring and between the first optical ring and the second optical ring, the apparatus including: (b) a plurality of group demultiplexers that demultiplex for each wavelength group and respectively output the wavelength multiplexed lights respectively input from the pairs of the annular optical fibers; (c) a plurality of wavelength demultiplexers that demultiplex for each wavelength and respectively output an optical signal of a wavelength group containing only light of wavelength preliminarily set for the intra-ring transmission among the wavelength groups output from the plurality of the group demultiplexers; (d) a plurality of group multiplexers that multiplex lights of wavelength groups respectively input for transmission to the pairs of the annular optical fibers to respectively output the lights to the pairs of the annular optical fibers; (e) a plurality of wavelength multiplexers that multiplex lights of wavelengths respectively input for the intra-ring traffic into wavelength groups to respectively output the wavelength groups to the plurality of the group multiplexers; (f) a plurality of intra-ring traffic switch devices that branch/insert as needed and distribute lights of respective wavelengths respectively output from the plurality of the wavelength demultiplexers to the wavelength multiplexers performing output to the optical ring that has transmitted the light among the plurality of the wavelength multiplexers; (g) a plurality of inter-ring transmission wavelength group switch devices that respectively distribute to the plurality of the group multiplexers the wavelength groups containing only lights of wavelengths preliminarily set for the inter-ring transmission among a plurality of wavelength groups respectively output from the plurality of the group demultiplexers; and (h) a type-mixed wavelength group multiplexing/demultiplexing device that demultiplexes a type-mixed wavelength group including wavelengths having mutually different traffic types of the inter-ring transmission among a plurality of wavelength groups respectively output from the plurality of the group demultiplexers into lights of respective wavelengths, the type-mixed wavelength group multiplexing/demultiplexing device performing routing by using a switch device to multiplex and output new respective wavelength groups including lights of wavelengths having the same traffic types of the inter-ring transmission from the demultiplexed lights with multiplexers to the plurality of the wavelength group multiplexers through the inter-ring transmission wavelength group switch devices.

The object indicated above is achieved by the invention according to claim 5, which provides a routing method of an optical communication network node apparatus in an optical communication network (a) containing a concatenated ring network containing N rings including a first optical ring and a second optical ring each having at least two annular optical fibers, the optical communication network node apparatus including a plurality of demultiplexers that demultiplex for each wavelength or each wavelength group and respectively output wavelength multiplexed lights respectively input from the pairs of the annular optical fibers and a plurality of multiplexers that multiplex lights respectively input for transmission to the pairs of the annular optical fibers to respectively output the multiplexed wavelength multiplexed lights to the pairs of the annular optical fibers, the optical communication network node apparatus achieving connection within each of the rings and between the optical rings in the N rings for the transmission of the wavelength multiplexed lights, the method including: (b) an intra-ring traffic step of performing a routing process of light of wavelength preliminarily set for the intra-ring transmission among the lights output from the plurality of the demultiplexers to directly or indirectly distribute the light to the multiplexers performing output to the optical fibers in the ring that has transmitted the light among the plurality of the multiplexers; and (c) an inter-ring traffic step of performing a routing process of light of another wavelength preliminarily set for inter-ring transmission and different from the light of wavelength preliminarily set for the intra-ring transmission among the lights output from the plurality of the demultiplexers to directly or indirectly distribute the light to the plurality of the multiplexers.

The object indicated above is achieved by the invention according to claim 6, which provides an optical communication network node apparatus in an optical communication network (a) containing a concatenated ring network containing N rings including a first optical ring and a second optical ring each having at least two annular optical fibers, the optical communication network inter-optical-ring node apparatus achieving connection within each of the rings and between the optical rings in the N rings for transmission of wavelength multiplexed lights, the apparatus including: (b) a plurality of demultiplexers that demultiplex for each wavelength or for each wavelength group and respectively output the wavelength multiplexed lights respectively input from the pairs of the annular optical fibers; (c) a plurality of multiplexers that multiplex lights of wavelengths respectively input for transmission to the pairs of the annular optical fibers to respectively output the lights to the pairs of the annular optical fibers; (d) a plurality of intra-ring traffic switch devices that respectively distribute light of wavelength preliminarily set for the intra-ring transmission among the lights of respective wavelengths or respective wavelength groups output from the plurality of the demultiplexers to the multiplexers performing output to the optical ring that has transmitted the light among the plurality of the multiplexers; and (e) a plurality of inter-ring traffic switch devices provided between the plurality of the demultiplexers and the plurality of the multiplexers to respectively distribute to the plurality of the multiplexers the light of another wavelength preliminarily set for the inter-ring transmission and different from the light of wavelength preliminarily set for the intra-ring transmission among the lights of respective wavelengths or respective wavelength groups respectively output from the demultiplexers.

The object indicated above is achieved by the invention according to claim 7, which provides an optical communication network node apparatus in an optical communication network (a) containing a concatenated ring network containing N rings including a first optical ring and a second optical ring each having at least two annular optical fibers, the optical communication network node apparatus achieving connection within each of the rings and between the optical rings in the N rings for transmission of wavelength multiplexed lights, the apparatus including: (b) a plurality of wavelength demultiplexers that demultiplex for each wavelength and respectively output the wavelength multiplexed lights respectively input from the pairs of the annular optical fibers; (c) a plurality of wavelength multiplexers that multiplex lights of wavelengths respectively input for transmission to the pairs of the annular optical fibers to respectively output the lights to the pairs of the annular optical fibers; (d) a first intra-ring traffic switch device provided between a pair of first wavelength demultiplexers receiving input from the annular optical fibers making up the first optical ring among the plurality of the wavelength demultiplexers and a pair of first wavelength multiplexers performing output to the annular optical fibers making up the first optical ring among the plurality of the wavelength multiplexers to respectively distribute to the pair of the first wavelength multiplexers the light of wavelength preliminarily set for the intra-ring transmission among the lights of respective wavelengths output from the first wavelength demultiplexers; (e) a second intra-ring traffic switch device provided between a pair of second wavelength demultiplexers receiving input from the annular optical fibers making up the second optical ring among the plurality of the wavelength demultiplexers and a pair of second wavelength multiplexers performing output to the annular optical fibers making up the second optical ring among the plurality of the wavelength multiplexers to branch/insert as needed and respectively distribute to the pair of the second wavelength multiplexers the light of wavelength preliminarily set for the intra-ring transmission among the lights of respective wavelengths output from the second wavelength demultiplexers; and (f) a plurality of inter-ring traffic switch devices provided between the plurality of the wavelength demultiplexers and the plurality of the wavelength multiplexers to respectively distribute to the plurality of the wavelength multiplexers the light of another wavelength preliminarily set for the inter-ring transmission and different from the light of wavelength preliminarily set for the intra-ring transmission among the lights of respective wavelengths respectively output from the wavelength demultiplexers.

The object indicated above is achieved by the invention according to claim 8, which provides an optical communication network node apparatus in an optical communication network (a) including N rings including a first optical ring and a second optical ring each having at least two annular optical fibers, the optical communication network node apparatus setting a transmission path of wavelength multiplexed light including a plurality of wavelengths within each of the rings and between the optical rings in the N rings, the apparatus including: (b) a plurality of group demultiplexers that demultiplex for each wavelength group and respectively output the wavelength multiplexed lights respectively input from the pairs of the annular optical fibers; (c) a plurality of wavelength demultiplexers that demultiplex for each wavelength and respectively output an optical signal of a wavelength group containing only light of wavelength preliminarily set for the intra-ring transmission among the wavelength groups output from the plurality of the group demultiplexers; (d) a plurality of group multiplexers that multiplex lights of wavelength groups respectively input for transmission to the pairs of the annular optical fibers to respectively output the lights to the pairs of the annular optical fibers; (e) a plurality of wavelength multiplexers that multiplex lights of wavelengths respectively input for the intra-ring traffic into wavelength groups to respectively output the wavelength groups to the plurality of the group multiplexers; (f) a plurality of intra-ring traffic switch devices that branch/insert as needed and distribute lights of respective wavelengths respectively output from the plurality of the wavelength demultiplexers to the wavelength multiplexers performing output to the optical ring that has transmitted the light among the plurality of the wavelength multiplexers; (g) a plurality of inter-ring transmission wavelength group switch devices that respectively distribute to the plurality of the group multiplexers the wavelength groups containing only lights of wavelengths preliminarily set for the inter-ring transmission among a plurality of wavelength groups respectively output from the plurality of the group demultiplexers; and (h) a type-mixed wavelength group multiplexing/demultiplexing device that demultiplexes a type-mixed wavelength group including wavelengths having mutually different traffic types of the inter-ring transmission among a plurality of wavelength groups respectively output from the plurality of the group demultiplexers into lights of respective wavelengths, the type-mixed wavelength group multiplexing/demultiplexing device performing routing by using a switch device to multiplex and output new respective wavelength groups including lights of wavelengths having the same traffic types of the inter-ring transmission from the demultiplexed lights with multiplexers to the plurality of the wavelength group multiplexers through the inter-ring transmission wavelength group switch devices.

Effect of Invention

The routing method of an optical communication network node apparatus of the invention according to claim 1 includes (b) an intra-ring traffic step of performing a routing process of light of wavelength preliminarily set for intra-ring transmission among the lights output from the plurality of the demultiplexers to directly or indirectly distribute the light to the multiplexers performing output to the optical fibers in the ring that has transmitted the light among the plurality of the multiplexers; and (c) an inter-ring traffic step of performing a routing process of light of another wavelength preliminarily set for the inter-ring transmission and different from the light of wavelength preliminarily set for the intra-ring transmission among the lights output from the plurality of the demultiplexers to directly or indirectly distribute the light to the plurality of the multiplexers. Accordingly, at the time of routing on the basis of wavelength or wavelength group, the total of the scale of the switch devices for routing the light of the wavelength preliminarily set for the intra-ring transmission within each optical ring and the scale of the switch devices for routing the light of the wavelength preliminarily set for the inter-ring transmission between optical rings is considerably reduced to a smaller scale as compared to a node apparatus that achieves concatenation in a manner capable of routing lights of all the wavelengths to arbitrary optical rings.

The routing method of an optical communication network node apparatus of the invention according to claim 2 includes (d) a plurality of intra-ring traffic switch devices that respectively distribute light of wavelength preliminarily set for the intra-ring transmission among the lights of respective wavelengths or respective wavelength groups output from the plurality of the demultiplexers to the multiplexers performing output to the optical ring that has transmitted the light among the plurality of the multiplexers; and (e) a plurality of inter-ring traffic switch devices provided between the plurality of the demultiplexers and the plurality of the multiplexers to respectively distribute to the plurality of the multiplexers the light of another wavelength preliminarily set for the inter-ring transmission and different from the light of wavelength preliminarily set for the intra-ring transmission among the lights of respective wavelengths or respective wavelength groups respectively output from the demultiplexers. Accordingly, at the time of routing on the basis of wavelength or wavelength group, the total of the scale of the switch devices for routing the light of the wavelength preliminarily set for the intra-ring transmission within each optical ring and the scale of the switch devices for routing the light of the wavelength preliminarily set for the inter-ring transmission between optical rings is considerably reduced to a smaller scale as compared to a node apparatus that achieves concatenation in a manner capable of routing lights of all the wavelengths to arbitrary optical rings.

The routing method of an optical communication network node apparatus of the invention according to claim 3 includes (d) a first intra-ring traffic switch device provided between a pair of first wavelength demultiplexers receiving input from the annular optical fibers making up the first optical ring among the plurality of the wavelength demultiplexers and a pair of first wavelength multiplexers performing output to the annular optical fibers making up the first optical ring among the plurality of the wavelength multiplexers to respectively distribute to the pair of the first wavelength multiplexers the light of wavelength preliminarily set for the intra-ring transmission among the lights of respective wavelengths output from the first wavelength demultiplexers; (e) a second intra-ring traffic switch device provided between a pair of second wavelength demultiplexers receiving input from the annular optical fibers making up the second optical ring among the plurality of the wavelength demultiplexers and a pair of second wavelength multiplexers performing output to the annular optical fibers making up the second optical ring among the plurality of the wavelength multiplexers to branch/insert as needed and respectively distribute to the pair of the second wavelength multiplexers the light of wavelength preliminarily set for the intra-ring transmission among the lights of respective wavelengths output from the second wavelength demultiplexers; and (f) a plurality of inter-ring traffic switch devices provided between the plurality of the wavelength demultiplexers and the plurality of the wavelength multiplexers to respectively distribute to the plurality of the wavelength multiplexers the light of another wavelength preliminarily set for the inter-ring transmission and different from the light of wavelength preliminarily set for the intra-ring transmission among the lights of respective wavelengths respectively output from the wavelength demultiplexers. Accordingly, at the time of routing on the basis of wavelength, the total of the scale of the switch devices for routing the light of the wavelength preliminarily set for the intra-ring transmission within each optical ring and the scale of the switch devices for routing the light of the wavelength preliminarily set for the inter-ring transmission between optical rings is considerably reduced to a smaller scale as compared to a node apparatus that achieves concatenation in a manner capable of routing lights of all the wavelengths to arbitrary optical rings.

The routing method of an optical communication network node apparatus of the invention according to claim 4 includes (f) a plurality of intra-ring traffic switch devices that branch/insert as needed and distribute lights of respective wavelengths respectively output from the plurality of the wavelength demultiplexers to the wavelength multiplexers performing output to the optical ring that has transmitted the light among the plurality of the wavelength multiplexers; (g) a plurality of inter-ring transmission wavelength group switch devices that respectively distribute to the plurality of the group multiplexers the wavelength groups containing only lights of wavelengths preliminarily set for the inter-ring transmission among a plurality of wavelength groups respectively output from the plurality of the group demultiplexers; and (h) a type-mixed wavelength group multiplexing/demultiplexing device that demultiplexes a type-mixed wavelength group including wavelengths having mutually different traffic types of the inter-ring transmission among a plurality of wavelength groups respectively output from the plurality of the group demultiplexers into lights of respective wavelengths, the type-mixed wavelength group multiplexing/demultiplexing device performing routing by using a switch device to multiplex and output new respective wavelength groups including lights of wavelengths having the same traffic types of the inter-ring transmission from the demultiplexed lights with multiplexers to the plurality of the wavelength group multiplexers through the inter-ring transmission wavelength group switch devices. Accordingly, at the time of routing on the basis of wavelength group, the total of the scale of the switch devices for routing the light of the wavelength preliminarily set for the intra-ring transmission within each optical ring and the scale of the switch devices for routing the light of the wavelength preliminarily set for the inter-ring transmission between optical rings is considerably reduced to a smaller scale as compared to a node apparatus that achieves concatenation in a manner capable of routing lights of all the wavelengths to arbitrary optical rings.

The routing method of an optical communication network node apparatus of the invention according to claim 5 includes (b) an intra-ring traffic step of performing a routing process of light of wavelength preliminarily set for the intra-ring transmission among the lights output from the plurality of the demultiplexers to directly or indirectly distribute the light to the multiplexers performing output to the optical fibers in the ring that has transmitted the light among the plurality of the multiplexers; and (c) an inter-ring traffic step of performing a routing process of light of another wavelength preliminarily set for inter-ring transmission and different from the light of wavelength preliminarily set for the intra-ring transmission among the lights output from the plurality of the demultiplexers to directly or indirectly distribute the light to the plurality of the multiplexers. Accordingly, at the time of routing on the basis of wavelength or wavelength group, the total of the scale of the switch devices for routing the light of the wavelength preliminarily set for the intra-ring transmission within each optical ring and the scale of the switch devices for routing the light of the wavelength preliminarily set for the inter-ring transmission between optical rings is considerably reduced to a smaller scale as compared to a node apparatus that achieves concatenation in a manner capable of routing lights of all the wavelengths to arbitrary optical rings.

The routing method of an optical communication network node apparatus of the invention according to claim 6 includes (b) a plurality of demultiplexers that demultiplex for each wavelength or for each wavelength group and respectively output the wavelength multiplexed lights respectively input from the pairs of the annular optical fibers; (c) a plurality of multiplexers that multiplex lights of wavelengths respectively input for transmission to the pairs of the annular optical fibers to respectively output the lights to the pairs of the annular optical fibers; (d) a plurality of intra-ring traffic switch devices that respectively distribute light of wavelength preliminarily set for the intra-ring transmission among the lights of respective wavelengths or respective wavelength groups output from the plurality of the demultiplexers to the multiplexers performing output to the optical ring that has transmitted the light among the plurality of the multiplexers; and (e) a plurality of inter-ring traffic switch devices provided between the plurality of the demultiplexers and the plurality of the multiplexers to respectively distribute to the plurality of the multiplexers the light of another wavelength preliminarily set for the inter-ring transmission and different from the light of wavelength preliminarily set for the intra-ring transmission among the lights of respective wavelengths or respective wavelength groups respectively output from the demultiplexers. Accordingly, at the time of routing on the basis of wavelength or wavelength group, the total of the scale of the switch devices for routing the light of the wavelength preliminarily set for the intra-ring transmission within each optical ring and the scale of the switch devices for routing the light of the wavelength preliminarily set for the inter-ring transmission between optical rings is considerably reduced to a smaller scale as compared to a node apparatus that achieves concatenation in a manner capable of routing lights of all the wavelengths to arbitrary optical rings.

The routing method of an optical communication network node apparatus of the invention according to claim 7 includes (b) a plurality of wavelength demultiplexers that demultiplex for each wavelength and respectively output the wavelength multiplexed lights respectively input from the pairs of the annular optical fibers; (c) a plurality of wavelength multiplexers that multiplex lights of wavelengths respectively input for transmission to the pairs of the annular optical fibers to respectively output the lights to the pairs of the annular optical fibers; (d) a first intra-ring traffic switch device provided between a pair of first wavelength demultiplexers receiving input from the annular optical fibers making up the first optical ring among the plurality of the wavelength demultiplexers and a pair of first wavelength multiplexers performing output to the annular optical fibers making up the first optical ring among the plurality of the wavelength multiplexers to respectively distribute to the pair of the first wavelength multiplexers the light of wavelength preliminarily set for the intra-ring transmission among the lights of respective wavelengths output from the first wavelength demultiplexers; (e) a second intra-ring traffic switch device provided between a pair of second wavelength demultiplexers receiving input from the annular optical fibers making up the second optical ring among the plurality of the wavelength demultiplexers and a pair of second wavelength multiplexers performing output to the annular optical fibers making up the second optical ring among the plurality of the wavelength multiplexers to branch/insert as needed and respectively distribute to the pair of the second wavelength multiplexers the light of wavelength preliminarily set for the intra-ring transmission among the lights of respective wavelengths output from the second wavelength demultiplexers; and (f) a plurality of inter-ring traffic switch devices provided between the plurality of the wavelength demultiplexers and the plurality of the wavelength multiplexers to respectively distribute to the plurality of the wavelength multiplexers the light of another wavelength preliminarily set for the inter-ring transmission and different from the light of wavelength preliminarily set for the intra-ring transmission among the lights of respective wavelengths respectively output from the wavelength demultiplexers. Accordingly, at the time of routing on the basis of wavelength, the total of the scale of the switch devices for routing the light of the wavelength preliminarily set for the intra-ring transmission within each optical ring and the scale of the switch devices for routing the light of the wavelength preliminarily set for the inter-ring transmission between optical rings is considerably reduced to a smaller scale as compared to a node apparatus that achieves concatenation in a manner capable of routing lights of all the wavelengths to arbitrary optical rings.

The routing method of an optical communication network node apparatus of the invention according to claim 8 includes (b) a plurality of group demultiplexers that demultiplex for each wavelength group and respectively output the wavelength multiplexed lights respectively input from the pairs of the annular optical fibers; (c) a plurality of wavelength demultiplexers that demultiplex for each wavelength and respectively output an optical signal of a wavelength group containing only light of wavelength preliminarily set for the intra-ring transmission among the wavelength groups output from the plurality of the group demultiplexers; (d) a plurality of group multiplexers that multiplex lights of wavelength groups respectively input for transmission to the pairs of the annular optical fibers to respectively output the lights to the pairs of the annular optical fibers; (e) a plurality of wavelength multiplexers that multiplex lights of wavelengths respectively input for the intra-ring traffic into wavelength groups to respectively output the wavelength groups to the plurality of the group multiplexers; (f) a plurality of intra-ring traffic switch devices that branch/insert as needed and distribute lights of respective wavelengths respectively output from the plurality of the wavelength demultiplexers to the wavelength multiplexers performing output to the optical ring that has transmitted the light among the plurality of the wavelength multiplexers; (g) a plurality of inter-ring transmission wavelength group switch devices that respectively distribute to the plurality of the group multiplexers the wavelength groups containing only lights of wavelengths preliminarily set for the inter-ring transmission among a plurality of wavelength groups respectively output from the plurality of the group demultiplexers; and (h) a type-mixed wavelength group multiplexing/demultiplexing device that demultiplexes a type-mixed wavelength group including wavelengths having mutually different traffic types of the inter-ring transmission among a plurality of wavelength groups respectively output from the plurality of the group demultiplexers into lights of respective wavelengths, the type-mixed wavelength group multiplexing/demultiplexing device performing routing by using a switch device to multiplex and output new respective wavelength groups including lights of wavelengths having the same traffic types of the inter-ring transmission from the demultiplexed lights with multiplexers to the plurality of the wavelength group multiplexers through the inter-ring transmission wavelength group switch devices. Accordingly, at the time of routing on the basis of wavelength group, the total of the scale of the switch devices for routing the light of the wavelength preliminarily set for the intra-ring transmission within each optical ring and the scale of the switch devices for routing the light of the wavelength preliminarily set for the inter-ring transmission between optical rings is considerably reduced to a smaller scale as compared to a node apparatus that achieves concatenation in a manner capable of routing lights of all the wavelengths to arbitrary optical rings.

BRIEF DESCRIPTION OF DRAWINGS

FIG. 9 is a diagram of four types of inter-ring traffic and wavelength groups corresponding thereto of the wavelength multiplexed light in a pair of the optical rings of FIG. 1.

EXPLANATIONS OF LETTERS OR NUMERALS

10: optical communication network
R1: first optical ring
R2: second optical ring
Fa, Fb, Fc, Fd: annular optical fiber
N1, N2: inter-ring node apparatus
M1 to Mn: intra-ring node apparatus
Aa, Ab, Ac, Ad, Eb: wavelength demultiplexer (demultiplexer)
Ba, Bb, Bc, Bd, Ed: wavelength multiplexer (multiplexer)
S1: first intra-ring traffic switch device
S2: second intra-ring traffic switch device
Ca, Cb, Cc, Cd: group multiplexer/demultiplexer (group demultiplexer, demultiplexer)
Da, Db, Dc, Dd: group multiplexer/demultiplexer (group multiplexer, multiplexer)
S4: inter-ring traffic wavelength group switch device
E1, E2, E3: mixed wavelength group multiplexing/demultiplexing device
Ea: 8×8 wavelength group changeover switch
Ec: 4×4 wavelength group changeover switch
WB1 to WBK: wavelength group
WB2, WBi, WBk: type-mixed wavelength group
S5: intra-ring and inter-ring traffic switch device

BEST MODES FOR CARRYING OUT THE INVENTION

An embodiment of the present invention will now be described with reference to the conceptual drawings. Since the figures are conceptual diagrams, mechanical configurations of details and dimension ratios of respective portions are not necessarily precisely depicted.

First Embodiment

Figure 1:
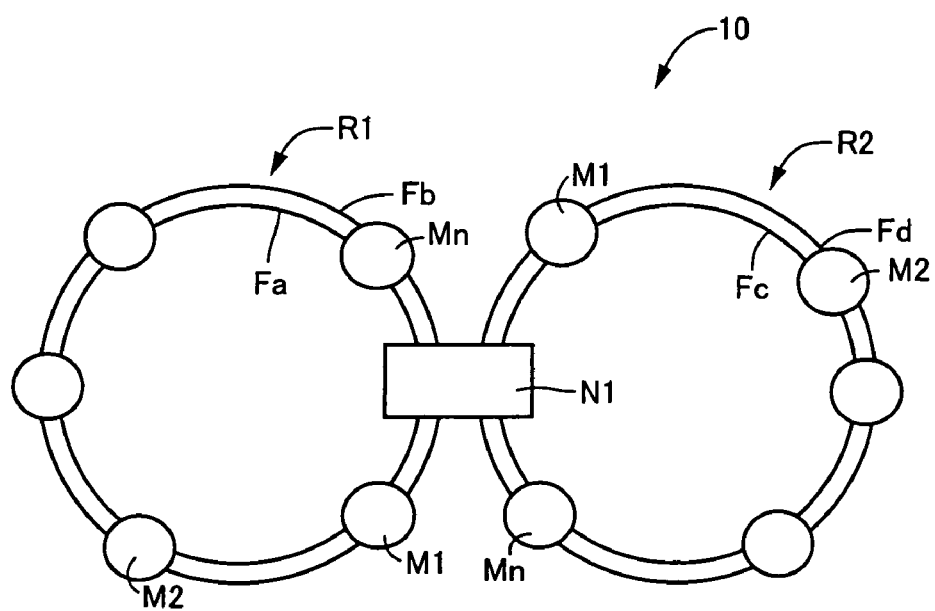
FIG. 1 is a conceptual diagram for explaining a pair of optical rings basically making up an optical communication network of an embodiment of the present invention and a node apparatus that concatenates the optical rings.
Figure 15:
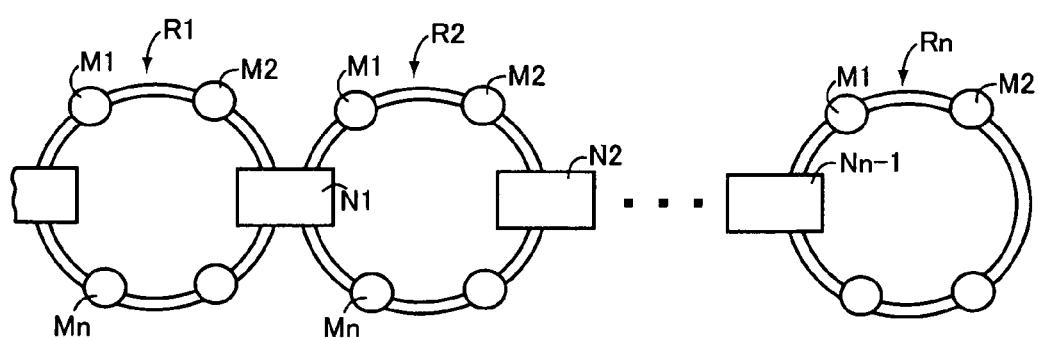
FIG. 15 is a conceptual diagram of an example of an optical communication network including the basic configuration of FIG. 1 and having a plurality of optical rings concatenated by inter-ring node apparatuses.
Figure 16:
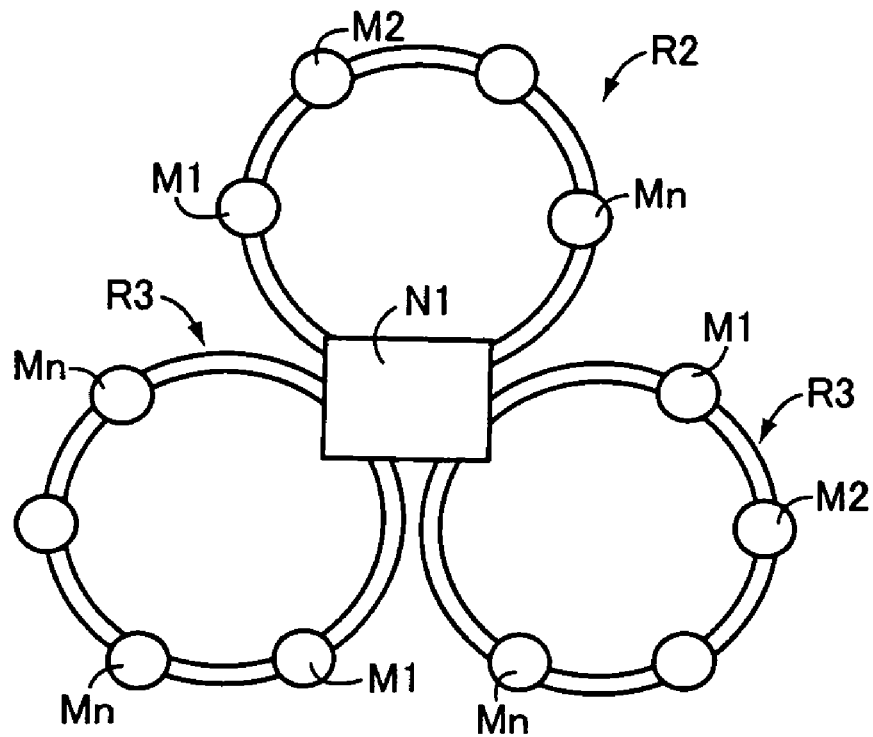
FIG. 16 is a conceptual diagram of an example of an optical communication network including the basic configuration of FIG. 1 and having three optical rings concatenated by one inter-ring node apparatus.
Figure 17:
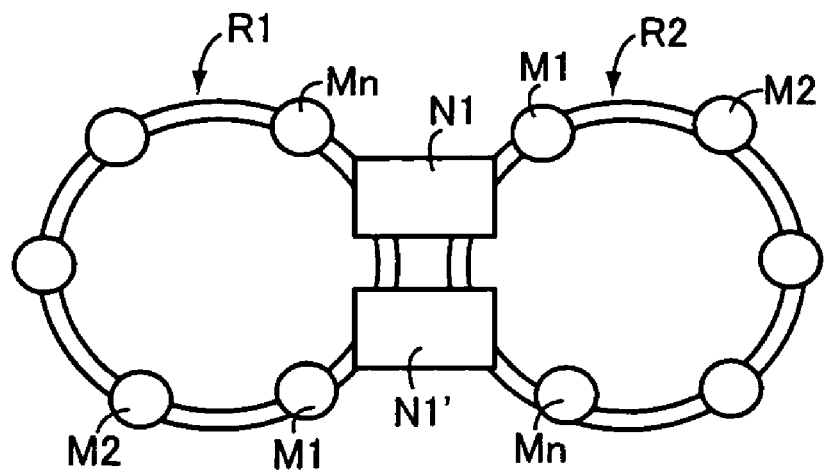
FIG. 17 is a conceptual diagram of an example of an optical communication network including the basic configuration of FIG. 1 and having two optical rings concatenated by two inter-ring node apparatuses.

FIG. 1 is a diagram for explaining a basic configuration of an optical communication network 10 containing a concatenated ring network, i.e., a pair of a first optical ring R1 and a second optical ring R2 concatenated through an inter-ring node apparatus N1. Actually, the first optical ring R1 and the second optical ring R2 are provided with a plurality of inter-ring node apparatuses M1 to Mn and are concatenated with other optical rings not depicted through other inter-ring node apparatuses not depicted. The first optical ring R1 and the second optical ring R2 is made up of at least a pair of annular optical fibers Fa, Fb and a pair of annular optical fibers Fc, Fd, respectively, and bidirectional communications in the clockwise and counterclockwise directions are enabled in each of the first optical ring R1 and the second optical ring R2. FIG. 1 depicts a basic configuration of the optical network 10 and various aspects actually exist as depicted in FIGS. 15 to 17. FIG. 15 depicts an example of concatenating a plurality of rings R1 to Rn by connecting two optical rings R1 and R2 with a plurality of inter-ring node apparatus N1 to Nn−1. FIG. 16 depicts an example of connecting three optical rings R1 to R3 with one inter-ring node apparatus N1. FIG. 17 depicts an example of connecting two optical rings R1 and R2 with two inter-ring node apparatus N1 and N1'.

The configuration of the inter-ring node apparatus (hereinafter, simply "node apparatus") N1 of FIG. 1 will hereinafter be described as a representation. The node apparatus N1 is configured to be capable of the intra-ring routing within the first optical ring R1 and the second optical ring R2 and the inter-ring routing between the first optical ring R1 and the second optical ring R2 for wavelength multiplexed light depicted in FIG. 2. The wavelength multiplexed light includes a plurality of wavelengths (wavelength channels) $\lambda 1$ to $\lambda L$ corresponding to a plurality of communication channel for transmitting optical signals of respective wavelengths. The wavelength multiplexed light is handled on the basis of a plurality of wavelength groups (bands) B, each of which is formed by a predetermined number W of the wavelengths (e.g., W=4).

Figure 3:
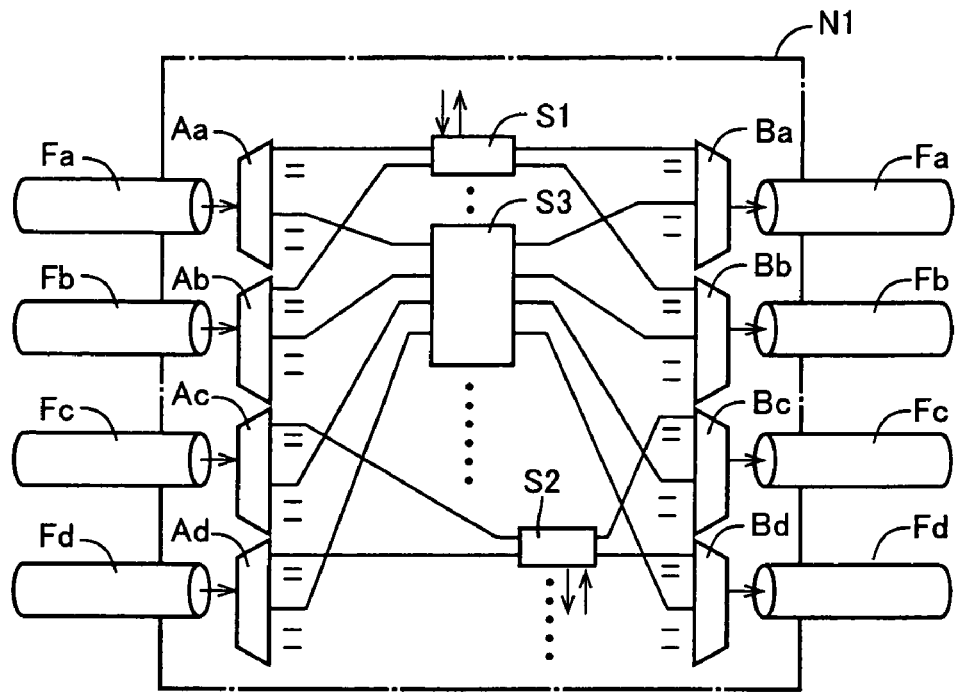
FIG. 3 is a diagram for explaining a relevant part of the configuration of the node apparatus of FIG. 1.

FIG. 3 depicts an example of a configuration of the one-layer node apparatus N1. As depicted in FIG. 3, the node apparatus N1 is provided between one ends and the other ends of pairs of annular optical fibers Fa, Fb, Fc, Fd making up the first optical ring R1 and the second optical ring R2, and bidirectionally performs the intra-ring routing and the inter-ring routing. The node apparatus N1 includes a plurality of (in this embodiment, four) wavelength demultiplexers (demultiplexers) Aa, Ab, Ac, Ad that demultiplex for each wavelength and respectively output the wavelength multiplexed lights input respectively from the annular optical fibers Fa, Fb, Fc, Fd; a plurality of (in this embodiment, four) wavelength multiplexers (multiplexers) Ba, Bb, Bc, Bd that multiplex lights of wavelengths respectively input for transmission to the other ends of a pair of the annular optical fibers Fa, Fb or Fc, Fd to respectively output the lights to the other ends of a pair of the annular optical fibers Fa, Fb or Fc, Fd; a first intra-ring traffic switch device S1 for traffic control between one ends and the other ends of the two annular optical fibers Fa, Fb making up the first optical ring R1; a second intra-ring traffic switch device S2 for controlling the routing between one ends and the other ends of the two annular optical fibers Fc, Fd making up the second optical ring R2; and an inter-ring traffic switch device S3 for controlling a routing ring between one ends of the annular optical fibers Fa, Fb, Fc, Fd and the other ends of the annular optical fibers Fa, Fb, Fc, Fd.

The wavelength demultiplexers Aa, Ab, Ac, Ad are respectively made up of well-known arrayed waveguide gratings AWG having input ports 16 and output ports 18. The wavelength demultiplexer Aa, Ab, Ac, Ad is configured in a monolithic structure by a so-called silica planar lightwave circuit that forms a waveguide with a predetermined pattern by depositing a clad and a core made of, for example, a silica material on a substrate made of silicon, for example. The wavelength demultiplexers Aa, Ab, Ac, Ad have a reversible nature and function as wavelength multiplexers for lights in the opposite direction.

Figure 4:
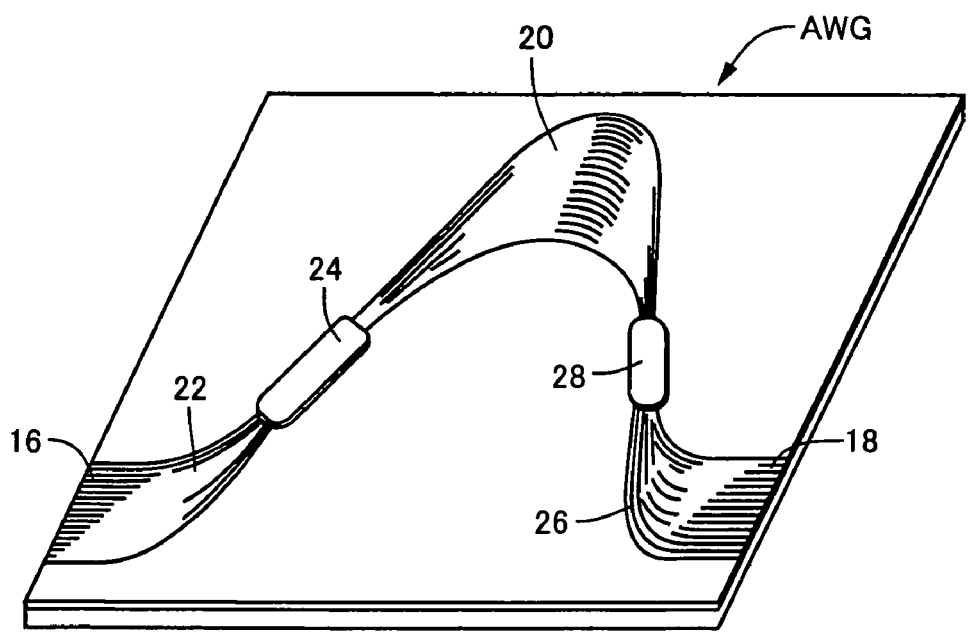
FIG. 4 is a perspective view for roughly explaining a configuration of an arrayed waveguide grating AWG making up an optical multiplexer/demultiplexer provided on the node apparatus of FIG. 3.

The arrayed waveguide grating AWG making up the wavelength demultiplexer Aa, Ab, Ac, Ad includes, for example, a plurality of arrayed waveguides 20 having path length differences with each other; a plurality of input-side waveguides 22 having respective input ports 16; an input lens waveguide 24 provided between the input-side waveguides 22 and the arrayed waveguides 20 to distribute the wavelength multiplexed light input to the input ports 16 through dispersion to input the light to the input-side ends of a plurality of the arrayed waveguides 20; a plurality of output-side waveguides 26 having respective output ports 18; an output lens waveguide 28 provided between the output-side waveguides 26 and the arrayed waveguides 20 to individually disperse and concentrate at the ends of the output-side waveguides 26 a plurality of wavelength channel included in the wavelength multiplexed light output from the output-side ends of a plurality of the arrayed waveguides 20 (e.g., a plurality of optical signals having mutually different wavelengths with the center wavelength positions differentiated by 100 GHz) for each wavelength through diffraction based on alternate optical path differences of a plurality of the arrayed waveguides 20 for demultiplexing to the preliminarily set output-side waveguides 26 to multiplex and output the light concentrated at the end of the one output-side waveguide 26 through the separate demultiplexing, as depicted in FIG. 4.

The effect on the propagated light is reversible in the arrayed waveguide grating AWG and the light input to the output ports 18 is multiplexed and output from the input ports 16 in the opposite direction. Therefore, each of the wavelength demultiplexers Aa, Ab, Ac, Ad made up of the arrayed waveguide grating AWG functions as an optical demultiplexer that demultiplexes the wavelength multiplexed light input from one end of each of the annular optical fibers Fa, Fb, Fc, Fd from the input port 16 side for each wavelength to output respective lights from the output port 18 side in the forward direction indicated by an arrow direction of FIG. 3. However, if a plurality of optical signals with different wavelengths is input from the output port 18 side, each of the wavelength demultiplexers also functions as an optical multiplexer that outputs the multiplexed light thereof to one end of the annular optical fiber Fa, Fb, Fc, Fd from the input port 16 side.

The wavelength multiplexers Ba, Bb, Bc, Bd are respectively made up of the arrayed waveguide gratings AWG of FIG. 4 as is the case with the wavelength demultiplexers Aa, Ab, Ac, Ad and the input port 16 side and the output port 18 side are used as an output port and an input port, respectively. Therefore, the wavelength multiplexer Ba, Bb, Bc, Bd functions as a wavelength multiplexer and, if a plurality of optical signals with different wavelengths is input from to the input port (the output port 18 side), the wavelength multiplexer Ba, Bb, Bc, Bd multiplexes the optical signals to output the multiplexed light thereof to the other end of the annular optical fiber Fa, Fb, Fc, Fd. The wavelength multiplexers Ba, Bb, Bc, Bd have a reversible nature and function as wavelength demultiplexers for lights in the opposite direction.

The first intra-ring traffic switch device S1, the second intra-ring traffic switch device S2, and the inter-ring traffic switch device S3 are made up of well-known optical switch devices, for example, a waveguide-type Mach-Zehnder interferometer (MZI) optical switch, a Y-branched optical switch, a bubble reflection optical switch, a fiber drive optical switch, a semiconductor amplifier optical switch, and a spatial propagation two-dimensional and three dimensional MEMS (Micro Electro Mechanical System) mirror-type optical switch. The case of two-dimensional configuration with MEMS mirror-type optical switches will hereinafter be described with reference to FIGS. 5 and 6.

Figure 5:
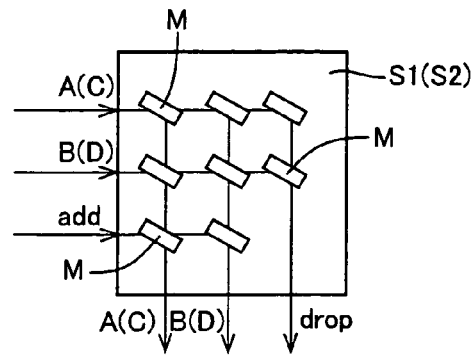
FIG. 5 is a diagram for explaining a configuration of a first intra-ring traffic switch device or a second intra-ring traffic switch device provided on the node apparatus of FIG. 3 when achieved by using two-dimensional MEMS switches.

Since the first intra-ring traffic switch device S1 and the second intra-ring traffic switch device S2 are configured in the same way, exemplary configurations thereof are described with reference to FIG. 5 in common. The first intra-ring traffic switch device S1 is provided between one ends of the annular optical fibers Fa and Fb and the other ends of Fa and Fb through the wavelength demultiplexers Aa, Ab and the wavelength multiplexers Ba, Bb. As depicted in FIG. 5, the first intra-ring traffic switch device S1 is a 3×3 optical changeover switch including an input terminal A that receives an optical signal of one wavelength channel from one end of the annular optical fiber Fa, an input terminal B that receives an optical signal of one wavelength channel from one end of the annular optical fiber Fb, an input terminal add that receives an optical signal of the same wavelength channel inserted in the node apparatus N1, an output terminal A for outputting the optical signal of one wavelength channel to the other end of the annular optical fiber Fa, an output terminal B for outputting the optical signal of one wavelength channel to the other end of the annular optical fiber Fb, an output terminal drop that outputs the optical signal taken out (dropped) for processing in the node apparatus N1, and eight movable mirrors M selectively projected to reflection positions and movably disposed at intersections of optical paths spatially configured in a matrix manner to link these terminals (except the intersection linking the input terminal add and the output terminal drop) and, in response to the input of an optical signal of each wavelength to each input terminal, the movable mirrors M are controlled to perform routing of the input signal to one of the output terminals corresponding to the destination preliminarily set thorough a control system not depicted for the input signal. The first intra-ring traffic switch device S1 is provided by the same number as the number of preliminarily set wavelength channels used in the intra-ring traffic within the first optical ring R1. In this embodiment, the movable mirrors M function as switch elements.

The second intra-ring traffic switch device S2 is provided between one ends of the annular optical fibers Fc and Fd and the other ends of Fc and Fd through the wavelength demultiplexers Ac, Ad and the wavelength multiplexers Bc, Bd. As depicted in FIG. 5, the second intra-ring traffic switch device S2 is a 3×3 optical switch including an input terminal C that receives an optical signal of one wavelength channel from one end of the annular optical fiber Fc, an input terminal D that receives an optical signal of one wavelength channel from one end of the annular optical fiber Fd, an input terminal add that receives an optical signal of the same wavelength channel inserted in the node apparatus N1, an output terminal C for outputting the optical signal of one wavelength channel to the other end of the annular optical fiber Fc, an output terminal D for outputting the optical signal of one wavelength channel to the other end of the annular optical fiber Fd, an output terminal drop that outputs the optical signal taken out (dropped) for processing in the node apparatus N1, and eight movable mirrors M disposed selectively movably to reflection positions at intersections of optical paths spatially configured in a matrix manner to link these terminals (except the intersection linking the input terminal add and the output terminal drop) and, in response to the input of an optical signal of each wavelength to each input terminal, the movable mirrors M are controlled to perform routing of the input signal to one of the output terminals corresponding to the destination preliminarily set thorough a control system not depicted for the input signal. The second intra-ring traffic switch, device S2 is provided by the same number as the number of preliminarily set wavelength channels used in the intra-ring traffic within the second optical ring R2.

Figure 6:
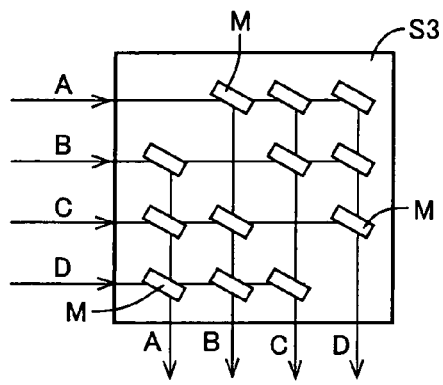
FIG. 6 is a diagram for explaining a configuration of an inter-ring traffic switch device provided on the node apparatus of FIG. 3 when achieved by using two-dimensional MEMS switches.

The inter-ring traffic switch device S3 is provided between one ends of the annular optical fibers Fa, Fb, Fc, Fd and the other ends thereof through the wavelength demultiplexers Aa, Ab, Ac, Ad and the wavelength multiplexers Ba, Bb, Bc, Bd and controls the routing between the one ends of the annular optical fibers Fa, Fb, Fc, Fd and the other ends thereof. As depicted in FIG. 6, the inter-ring traffic switch device S3 includes an input terminal A that receives an optical signal of one wavelength channel from one end of the annular optical fiber Fa, an input terminal B that receives an optical signal of one wavelength channel from one end of the annular optical fiber Fb, an input terminal C that receives an optical signal of one wavelength channel from one end of the annular optical fiber Fc, an input terminal D that receives an optical signal of one wavelength channel from one end of the annular optical fiber Fd, an output terminal A for outputting the optical signal of one wavelength channel to the other end of the annular optical fiber Fa, an output terminal B for outputting the optical signal of one wavelength channel to the other end of the annular optical fiber Fb, an output terminal C for outputting the optical signal of one wavelength channel to the other end of the annular optical fiber Fc, an output terminal D for outputting the optical signal of one wavelength channel to the other end of the annular optical fiber Fd, and 12 movable mirrors M disposed selectively movably to reflection positions at intersections of optical paths spatially configured in a matrix manner to link these terminals (except the intersection linking the input terminal A and the output terminal A, the intersection linking the input terminal B and the output terminal B, the intersection linking the input terminal C and the output terminal C, and the intersection linking the input terminal D and the output terminal D) and, an optical signal of each wavelength is routed by controlling the movable mirrors M to one of the output terminals corresponding to the destination preliminarily set thorough a control system for the input signal. The inter-ring traffic switch device S3 is provided by the number of preliminarily set wavelength channels used for the inter-ring traffic between the first optical ring R1 and the second optical ring, which are different from the preliminarily set intra-ring traffic wavelengths.

In the node apparatus N1 configured as above, the lights of all the wavelengths input from one end of the annular optical fibers Fa, Fb, Fc, Fd are respectively routed to the other predefined end of the annular optical fibers Fa, Fb, Fc, Fd on the basis of the wavelength channel through the operations of the first intra-ring traffic switch device S1, the second intra-ring traffic switch device S2, and the inter-ring traffic switch device S3. An inter-ring traffic rate $\alpha$ is a rate of the number of wavelengths preliminarily set for the inter-ring transmission to the number of all the wavelengths of the wavelength multiplexed light and is set to 50%, for example.

Figure 7:
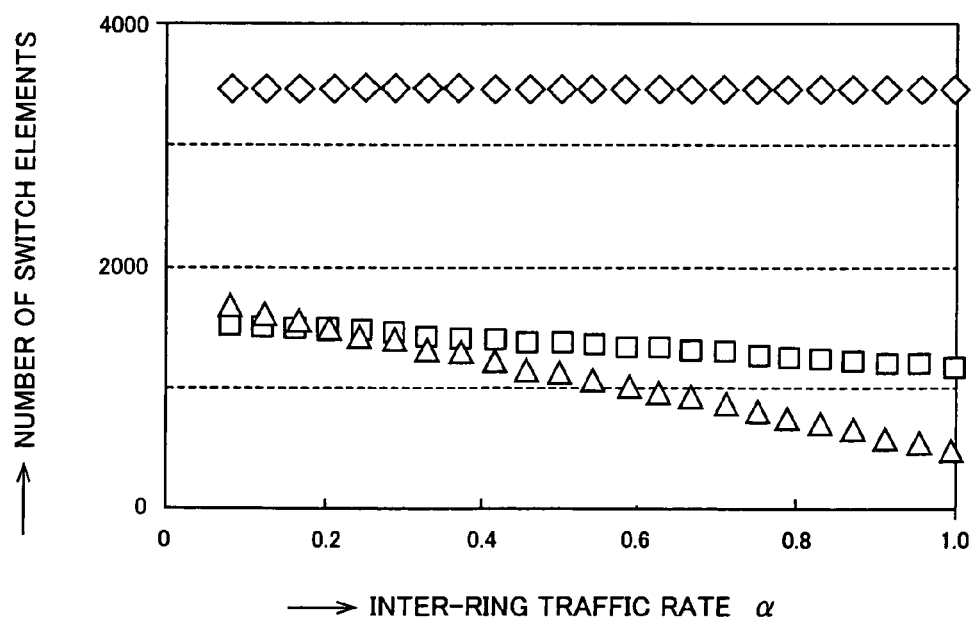
FIG. 7 is a diagram of the number of switch elements relative to an inter-ring traffic rate α in the node apparatus of FIG. 3 in comparison with a conventional node apparatus.

FIG. 7 depicts a relationship between the inter-ring traffic rate α and the number of switch elements when the number of wavelength multiplexes of the wavelength multiplexed light is set to 96. When the number of wavelength multiplexes of the wavelength multiplexed light is set to 96, the node apparatus N1 of the embodiment has the number of switch elements reduced by half as depicted by square marks □ of FIG. 7 in comparison with the conventional case indicated by diamond-shaped marks ◇ and the scale of the first intra-ring traffic switch device S1, the second intra-ring traffic switch device S2, and the inter-ring traffic switch device S3 is reduced, which makes the node apparatus N1 smaller and inexpensive.

In accordance with the node apparatus N1 of the embodiment, in the routing operation thereof, (1) at the intra-ring traffic step (the routing operation on the basis of wavelength by the first intra-ring traffic switch device S1 and the second intra-ring traffic switch device S2), among lights output from a plurality of demultiplexers (the wavelength demultiplexers Aa to Ab), the light of the wavelength preliminarily set for the intra-ring transmission is subjected to the routing process and is directly or indirectly distributed to multiplexers for outputting to an optical fiber ring that has transmitted the light (e.g., the wavelength multiplexers Ba to Bb in the case of the light of the wavelength channel input from the wavelength demultiplexers Aa to Ab) among a plurality of multiplexers (the wavelength multiplexers Ba to Bb); (2) at the inter-ring traffic step (the routing operation on the basis of wavelength by the inter-ring traffic switch device S3), among lights output from a plurality of demultiplexers (the wavelength demultiplexers Aa to Ad), the light of another wavelength preliminarily set for the inter-ring transmission and different from the light of the wavelength preliminarily set for the intra-ring transmission is subjected to the routing process and is directly or indirectly distributed to a plurality of multiplexers (e.g., the wavelength multiplexers Ba to Bd in the case of the light of the wavelength channel input from the wavelength demultiplexers Aa to Ad); and, therefore, at the time of routing on the basis of wavelength, the total of the scale of the switch devices for routing the light of the wavelength preliminarily set for the intra-ring transmission within each optical ring and the scale of the switch devices for routing the light of the wavelength preliminarily set for the inter-ring transmission between optical rings is considerably reduced to a smaller scale as compared to a conventional node apparatus that achieves concatenation in a manner capable of routing lights of all the wavelengths to arbitrary optical rings.

The node apparatus N1 of the embodiment includes (1) four wavelength demultiplexers (the wavelength demultiplexers Aa, Ab, Ac, Ad) that demultiplex for each wavelength and respectively output the wavelength multiplexed lights input respectively from one ends of pairs of the annular optical fibers Fa, Fb, Fc, Fd; (2) a plurality of wavelength multiplexers (the wavelength multiplexers Ba, Bb, Bc, Bd) that multiplex lights of wavelengths respectively input for transmission to the other ends of pairs of the annular optical fibers Fa, Fb, Fc, Fd to respectively output the lights to the other ends of the pairs of the annular optical fibers Fa, Fb, Fc, Fd; (3) the first intra-ring traffic switch device S1 provided between a pair of first wavelength demultiplexers (the wavelength demultiplexers Aa, Ab) receiving input from one ends of the annular optical fibers Fa, Fb making up the first optical ring R1 among a plurality of the wavelength demultiplexers (the wavelength demultiplexers Aa, Ab, Ac, Ad) and a pair of first wavelength multiplexers (the wavelength multiplexers Ba, Bb) performing output to the other ends of the annular optical fibers Fa, Fb making up the first optical ring R1 among a plurality of the wavelength multiplexers (the wavelength multiplexers Ba, Bb, Bc, Bd) to respectively distribute to the first wavelength multiplexers (the wavelength multiplexers Ba, Bb) the light of the wavelength preliminarily set for the intra-ring transmission among the lights of wavelengths output from the first wavelength demultiplexers (the wavelength demultiplexers Aa, Ab); (4) a pair of the second intra-ring traffic switch devices S2 provided between a pair of second wavelength demultiplexers (the wavelength demultiplexers Ac, Ad) receiving input from one ends of the annular optical fibers Fc, Fd making up the second optical ring R2 among a plurality of the wavelength demultiplexers (the wavelength demultiplexers Aa, Ab, Ac, Ad) and second wavelength multiplexers (the wavelength multiplexers Bc, Bd) performing output to the other ends of the annular optical fibers Fc, Fd making up the second optical ring R2 among a plurality of the wavelength multiplexers (the wavelength multiplexers Ba, Bb, Bc, Bd) to respectively distribute to a pair of the second wavelength multiplexers (the wavelength multiplexers/demultiplexers Bc, Bd) the light of the wavelength preliminarily set for the intra-ring transmission among the lights of wavelengths output from the second wavelength demultiplexers (the wavelength demultiplexers Ac, Ad); and (5) a plurality of the inter-ring traffic switch devices S3 provided between a plurality of the wavelength demultiplexers (wavelength demultiplexers Aa, Ab, Ac, Ad) and a plurality of the wavelength multiplexers (the wavelength multiplexers Ba, Bb, Bc, Bd) to respectively distribute to a plurality of the wavelength multiplexers (the wavelength multiplexers Ba, Bb, Bc, Bd) the light of another wavelength preliminarily set for the inter-ring transmission and different from the light of the wavelength preliminarily set for the intra-ring transmission among the lights of wavelengths respectively output from the wavelength demultiplexers (the wavelength demultiplexers Aa, Ab, Ac, Ad). Therefore, (6) by the first intra-ring traffic switch device S1 or at a first intra-ring traffic step, among lights of wavelengths output from a pair of the first wavelength demultiplexers (the wavelength demultiplexers Aa, Ab) receiving signal input from one ends of the annular optical fibers Fa, Fb making up the first optical ring R1 among a plurality of the wavelength demultiplexers (the wavelength demultiplexers Aa, Ab, Ac, Ad), the light of the wavelength preliminarily set for the intra-ring transmission is distributed to a pair of the first wavelength multiplexers (the wavelength multiplexers Ba, Bb) performing output to the other ends of the annular optical fibers Fa, Fb making up the first optical ring R1; (7) by the second intra-ring traffic switch device S2 or at a second intra-ring traffic step, among lights of wavelengths output from a pair of the second wavelength demultiplexers (the wavelength demultiplexers Ac, Ad) receiving signal input from one ends of the annular optical fibers Fc, Fd making up the second optical ring R2 among a plurality of the wavelength demultiplexers (the wavelength demultiplexers Aa, Ab, Ac, Ad), the light of the wavelength preliminarily set for the intra-ring transmission is distributed to a pair of the second wavelength multiplexers (the wavelength multiplexers Bc, Bd) performing output to the other ends of the annular optical fibers Fc, Fd making up the second optical ring R2; (8) by the inter-ring traffic switch devices S3 or at an inter-ring traffic step, among lights of wavelengths output from a plurality of the wavelength demultiplexers (the wavelength demultiplexers Aa, Ab, Ac, Ad), the light of the wavelength preliminarily set for the inter-ring transmission and different from the light of the wavelength preliminarily set for the intra-ring transmission is distributed by switching to a plurality the wavelength multiplexers (the wavelength multiplexers Ba, Bb, Bc, Bd); and, therefore, at the time of routing on the basis of wavelength, the total of the scale of the switch devices for routing the light of the wavelength preliminarily set for the intra-ring transmission within each optical ring and the scale of the switch devices for routing the light of the wavelength preliminarily set for the inter-ring transmission between optical rings is considerably reduced to a smaller scale as compared to a node apparatus that achieves concatenation in a manner capable of routing lights of all the wavelengths to arbitrary optical rings.

Second Embodiment

Another embodiment of the present invention will then be described. Portions common to the embodiments are denoted by the same reference numerals and will not be described.

Figure 8:
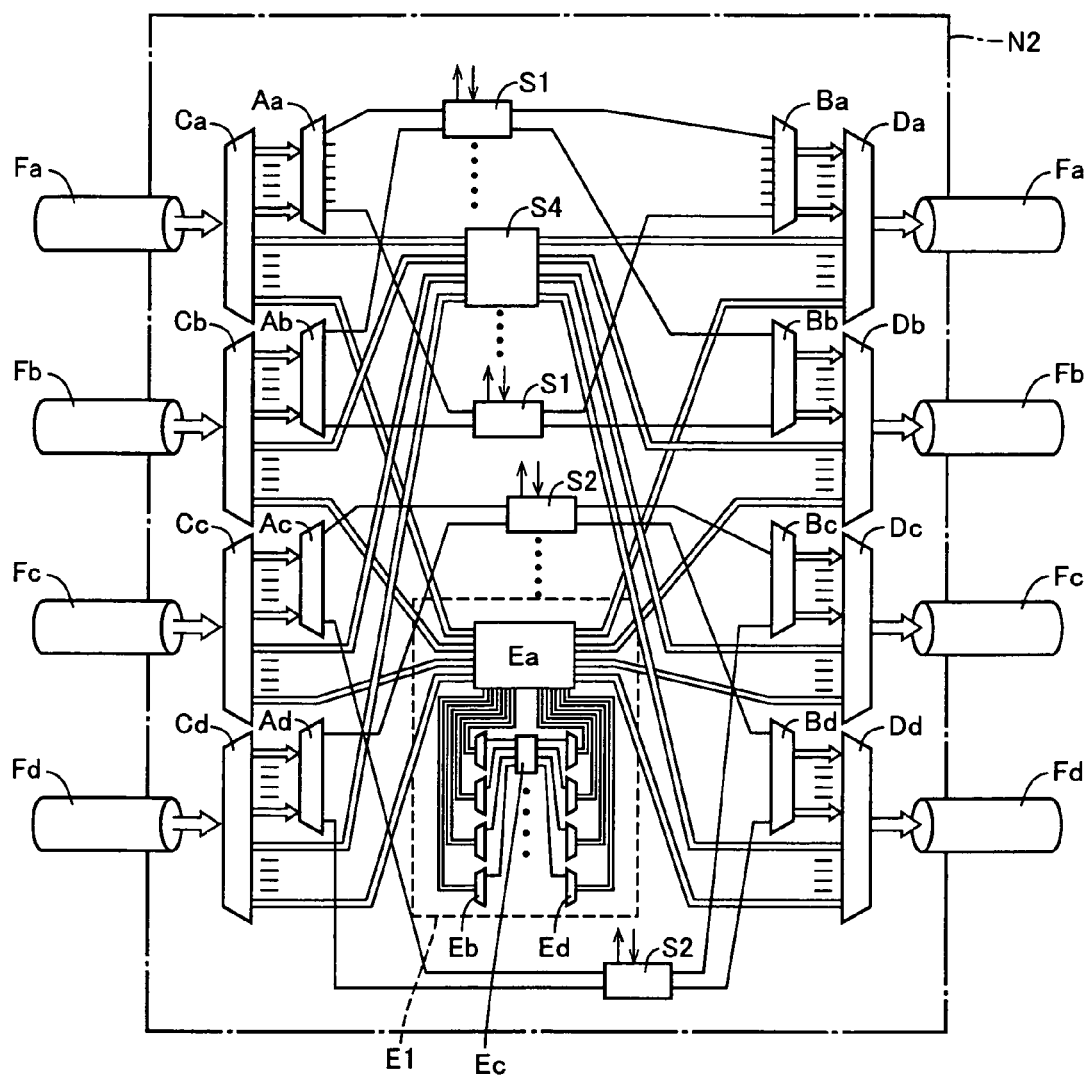
FIG. 8 is a diagram for explaining a relevant part of a configuration of a node apparatus according to another embodiment of the present invention.

FIG. 8 depicts a configuration of a two-layer node apparatus N2 additionally introducing a concept of routing on the basis of a wavelength group. After demultiplexing of wavelength demultiplexed light of FIG. 8, an optical path depicted by a single line indicates optical signals of one wavelength channel for each wavelength and an optical path depicted by a double line indicates optical signals of each wavelength group including optical signals of a plurality of wavelength channels. In an optical communication network including a first optical ring R1 and a second optical ring R2, each of which has two annular optical fibers Fa, Fb and Fc, Fd, the two-layer node apparatus N2 is configured to be capable of setting the transmission paths of wavelength multiplexed light including a plurality of wavelengths with a fewer number of switch elements M within the first optical ring R1 or the second optical ring R2 and between the first optical ring R1 and the second optical ring R2.

Figure 2:
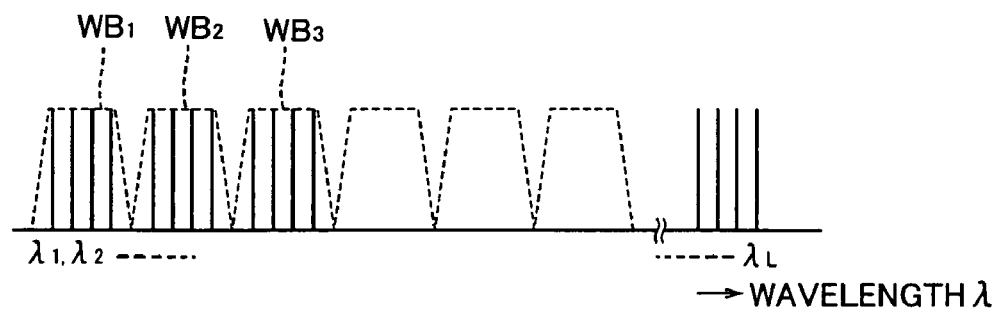
FIG. 2 is a diagram of an example of wavelength multiplexed light transmitted through the optical communication network of FIG. 1.

FIG. 2 above depicts wavelength multiplexed light having the number L of wavelength multiplexes of 96 defining four wavelength (W=4) as one band (one wavelength group) B and K wavelength groups WB1 to WBK containing only lights of wavelengths preliminarily set for the inter-ring transmission are depicted in FIG. 9 in four inter-ring traffic types. In FIG. 9, a portion surrounded by a dash line indicates a wavelength group; W denotes a wavelength for a working path; and P denotes a wavelength for a protection path. In FIG. 9, three type-mixed wavelength groups WB2, WBi, WBk include wavelengths belonging to different inter-ring traffic types. In FIG. 9, wavelengths λ1 to λKW are preliminarily set for the inter-ring traffic; the wavelengths λ1 to λKW are divided into four inter-ring traffic types 1 to 4; and remaining wavelengths λKW+1 to λL are set as those for the intra-ring traffic. For example, as exemplarily illustrated by the type-mixed wavelength group WB2 including the wavelengths belonging to the inter-ring traffic of the types 1 and 2, the three type-mixed wavelength groups WB2, WBi, WBk include wavelengths belonging to different inter-ring traffic types and, therefore, the three type-mixed wavelength groups WB2, WBi, WBk must be branched and multiplexed again to form wavelength groups including wavelengths of the same inter-ring traffic types.

As depicted in FIG. 8, the node apparatus N2 includes (1) a plurality of (in this embodiment, four) group demultiplexers Ca, Cb, Cc, Cd that demultiplex for each wavelength group and respectively output the wavelength multiplexed lights input respectively from one ends of pairs of the annular optical fibers Fa, Fb, Fc, Fd; (2) a plurality of wavelength demultiplexers Aa, Ab, Ac, Ad that demultiplex for each wavelength and respectively output the optical signals of the wavelength groups containing only lights of the wavelengths preliminarily set as those for the intra-ring transmission among the wavelength groups output from a plurality of the group demultiplexers Ca, Cb, Cc, Cd; (3) a plurality of (in this embodiment, four) group multiplexers Da, Db, Dc, Dd that multiplex lights of wavelength groups respectively input for transmission to the other ends of pairs of the annular optical fibers Fa, Fb, Fc, Fd to respectively output the lights to the other ends of the pairs of the annular optical fibers Fa, Fb, Fc, Fd; (4) a plurality of wavelength multiplexers Ba, Bb, Bc, Bd that multiplex lights of wavelengths respectively input for the intra-ring traffic to respectively output the lights on the basis of the wavelength groups to the plurality of the group multiplexers Da, Db, Dc, Dd; (5) pluralities (pairs for each wavelength) of first intra-ring traffic switch devices S1 and second intra-ring traffic switch devices S2 that distribute the lights of wavelengths respectively output from the plurality of the wavelength demultiplexers Aa, Ab, Ac, Ad to the wavelength multiplexers Ba, Bb or Bc, Bd performing output to the other end of the first optical ring R1 or the second optical ring R2 that has transmitted the light among the plurality of the wavelength multiplexers Ba, Bb, Bc, Bd; (6) a plurality of (one for each wavelength group) inter-ring traffic wavelength group switch devices S4 that respectively distributes to the plurality of the group multiplexers Da, Db, Dc, Dd the wavelength groups containing only lights of the wavelengths preliminarily set as those for the inter-ring transmission among a plurality of the wavelength groups respectively output from the plurality of the group demultiplexers Ca, Cb, Cc, Cd; and (7) switches for routing for demultiplexing into lights of respective wavelengths the type-mixed wavelength groups WB2, WBi, WBk including wavelengths having the mutually different inter-ring transmission traffic types among a plurality of the wavelength groups respectively output from the plurality of the group demultiplexers Ca, Cb, Cc, Cd to form new wavelength groups including lights of wavelengths having the same inter-ring transmission traffic types from the lights of respective wavelengths, multiplexers for the multiplexing into the wavelength groups, switches for routing of the formed wavelength groups to the other ends of the pairs of the annular optical fibers Fa, Fb, Fc, Fd, and three mixed wavelength group multiplexing/demultiplexing devices E1 to E3 that output the wavelength groups to the plurality of the wavelength group multiplexers.

In this embodiment, the inter-ring traffic rate α is a rate of the number of wavelengths preliminarily set for the inter-ring transmission to the number of all the wavelengths of the wavelength multiplexed light and is also set to about 50% as an example.

The group demultiplexers Ca, Cb, Cc, Cd are configured in the same way as the arrayed waveguide gratings AWG except that the wavelength multiplexed light is demultiplexed on the basis of wavelength groups. The group multiplexers Da, Db, Dc, Dd multiplex a plurality of wavelength groups to output wavelength multiplexed lights by using the arrayed waveguide gratings AWG in the opposite direction. The effect on the propagated light is reversible in the group demultiplexers Ca, Cb, Cc, Cd and the group multiplexers Da, Db, Dc, Dd; the group demultiplexers Ca, Cb, Cc, Cd and the group multiplexers Da, Db, Dc, Dd function as group demultiplexers and group multiplexers, respectively, in the forward direction indicated by arrows of FIG. 8; and the group multiplexers Da, Db, Dc, Dd and the group demultiplexers Ca, Cb, Cc, Cd function as group demultiplexers and group multiplexers, respectively, in the opposite direction of the arrows of FIG. 8.

The first intra-ring traffic switch device S1 and the second intra-ring traffic switch device S2 are made up of the 3×3 switches depicted in FIG. 5 same as those of the first embodiment and perform switch-over on the basis of a wavelength. The inter-ring traffic wavelength group switch devices S4 are made up of the 4×4 switches depicted in FIG. 6 same as the inter-ring traffic switch device S3 of the first embodiment and perform switch-over on the basis of a wavelength group.

Since the mixed wavelength group multiplexing/demultiplexing devices E1 to E3 are configured in the same way as each other, the mixed wavelength group multiplexing/demultiplexing device E1 will hereinafter be described. The mixed wavelength group multiplexing/demultiplexing device E1 includes a 8×8 wavelength group changeover switch Ea that receives the type-mixed wavelength group WB2 output from the group multiplexers/demultiplexers Ca, Cb, Cc, Cd to output to the group multiplexers Da, Db, Dc, Dd the wavelength groups with lights of wavelengths having the same inter-ring traffic types multiplexed from the demultiplexed wavelengths; a wavelength demultiplexer Eb that demultiplexes the type-mixed wavelength group WB2 received by the 8×8 wavelength group changeover switch Ea; a plurality of 4×4 wavelength changeover switches Ec as depicted in FIG. 6 that switches lights of the wavelengths demultiplexed by the wavelength demultiplexer Eb such that the lights of the same inter-ring traffic types are combined; and a wavelength multiplexer Ed that multiplexes the lights of respective wavelengths output from the 4×4 wavelength changeover switches Ec to output the lights to the 8×8 wavelength group changeover switch Ea.

Figure 10:
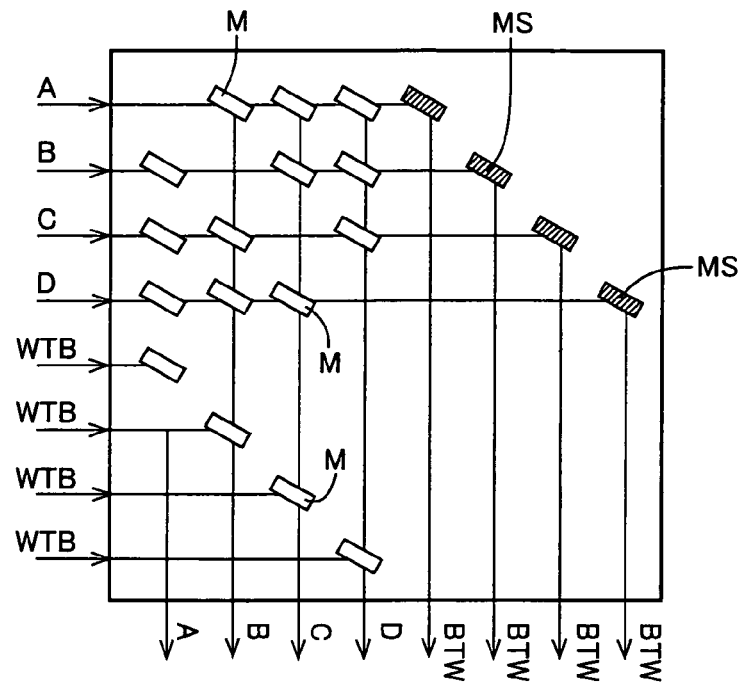
FIG. 10 is a diagram for explaining a configuration of an 8×8 wavelength group changeover switch Ea included in mixed wavelength group multiplexing/demultiplexing devices E1 to E3 provided on the node apparatus of FIG. 8 when achieved by using two-dimensional MEMS switches.

FIG. 10 depicts the case of the 8×8 wavelength group changeover switch Ea two-dimensionally configured with MEMS mirror-type optical switches for explaining the changeover function of the 8×8 wavelength group changeover switch Ea. Among the wavelength groups respectively input to four input terminals A, B, C, D from the group demultiplexers Ca, Cb, Cc, Cd, the 8×8 wavelength group changeover switch Ea outputs the type-mixed wavelength group WB2 to the wavelength demultiplexer Eb for demultiplexing. The wavelength groups respectively input to the input terminals WTB from the wavelength demultiplexer Eb are output through four output terminals A, B, C, D to the wavelength multiplexer Ba, Bb, Bc, Bd. In FIG. 10, black mirrors indicate fixed mirrors MS.

In the node apparatus N2 of the embodiment, as a result of performing the routing on the basis of a group, as indicated by Δ marks of FIG. 7, the number of switch elements is reduced by half as compared to the conventional case indicated by the diamond-shaped marks ◇; the number of switch elements becomes. smaller as the inter-ring traffic rate α becomes higher as compared to the first embodiment indicated by the square marks □; and, therefore, the total scale is reduced for the first intra-ring traffic switch device 1, the second intra-ring traffic switch device S2, the inter-ring traffic wavelength group switch devices S4, the 8×8 wavelength group changeover switches Ea of the mixed wavelength group multiplexing/demultiplexing devices E1 to E3, and the 4×4 wavelength changeover switches Ec, which further makes the node apparatus N2 smaller and inexpensive.

In accordance with the node apparatus N1 of the embodiment, in the routing operation thereof, (1) at the intra-ring traffic step (the routing operation on the basis of wavelength by the first intra-ring traffic switch device S1 and the second intra-ring traffic switch device S2), among lights output from a plurality of demultiplexers (the wavelength demultiplexers Aa to Ad), the light of the wavelength preliminarily set for the intra-ring transmission is subjected to the routing process and is directly or indirectly distributed to multiplexers for outputting to an optical fiber that has transmitted the light (e.g., the wavelength multiplexers Ba to Bb in the case of the light of the wavelength channel input from the wavelength demultiplexers Aa to Ab) among a plurality of multiplexers (the wavelength multiplexers Ba to Bd); (2) at the inter-ring traffic step (the routing operation on the basis of wavelength group by the inter-ring traffic wavelength group switch devices S4 and the mixed wavelength group multiplexing/demultiplexing devices E1 to E3), among lights output from a plurality of demultiplexers (the wavelength demultiplexers Aa to Ad), the light of another wavelength preliminarily set for the inter-ring transmission and different from the light of the wavelength preliminarily set for the intra-ring transmission is subjected to the routing process and is directly or indirectly distributed to a plurality of multiplexers (e.g., the wavelength multiplexers Bc to Bd in the case of the light of the wavelength channel input from the wavelength demultiplexers Aa to Ab); and, therefore, at the time of routing on the basis of wavelength, the total of the scale of the switch devices for routing the light of the wavelength preliminarily set for the intra-ring transmission within each optical ring and the scale of the switch devices for routing the light of the wavelength preliminarily set for the inter-ring transmission between optical rings is considerably reduced to a smaller scale as compared to a node apparatus that achieves concatenation in a manner capable of routing lights of all the wavelengths to arbitrary optical rings.

The node apparatus N2 of the embodiment includes (1) a plurality of intra-ring traffic switch devices (the first intra-ring traffic switch device S1 and the second intra-ring traffic switch device S2) that distribute lights of wavelengths respectively output from a plurality of wavelength demultiplexers (the wavelength demultiplexers Aa, Ab, Ac, Ad) to the wavelength multiplexers (e.g., the wavelength multiplexers Ba to Bb in the case of the light of the wavelength channels input from the wavelength demultiplexers Aa to Ab) performing output to the optical ring that has transmitted the light among a plurality of wavelength multiplexers (the wavelength multiplexers Ba, Bb, Bc, Bd); (2) a plurality of inter-ring transmission wavelength group switch devices (the inter-ring traffic wavelength group switch devices S4) that respectively distribute to a plurality of group multiplexers (the group multiplexers Da, Db, Dc, Dd) the wavelength groups WB1 to WBK containing only lights of wavelengths preliminarily set for the inter-ring transmission (except the type-mixed wavelength groups WB2, WBi, WBk) among a plurality of wavelength groups respectively output from a plurality of group demultiplexers (the group demultiplexers Ca, Cb, Cc, Cd); and (3) the type-mixed wavelength group multiplexing/demultiplexing devices E1 to E3 that demultiplex the type-mixed wavelength groups WB2, WBi, WBk including wavelengths having the mutually different inter-ring transmission traffic types among a plurality of wavelength groups respectively output from a plurality of group demultiplexers (the group demultiplexers Ca, Cb, Cc, Cd) into lights of respective wavelengths to multiplex and output new respective wavelength groups including lights of wavelengths having the same inter-ring transmission traffic types from the demultiplexed lights to the plurality of the wavelength group multiplexers, and, therefore, at the time of routing on the basis of wavelength group, the total of the scale of the switch devices for routing the light of the wavelength preliminarily set for the intra-ring transmission within each optical ring and the scale of the switch devices for routing the light of the wavelength preliminarily set for the inter-ring transmission between optical rings is considerably reduced to a smaller scale as compared to a node apparatus that achieves concatenation in a manner capable of routing lights of all the wavelengths to arbitrary optical rings, and becomes further reduced to a smaller scale by the traffic control on the basis of wavelength group.

Figure 12:
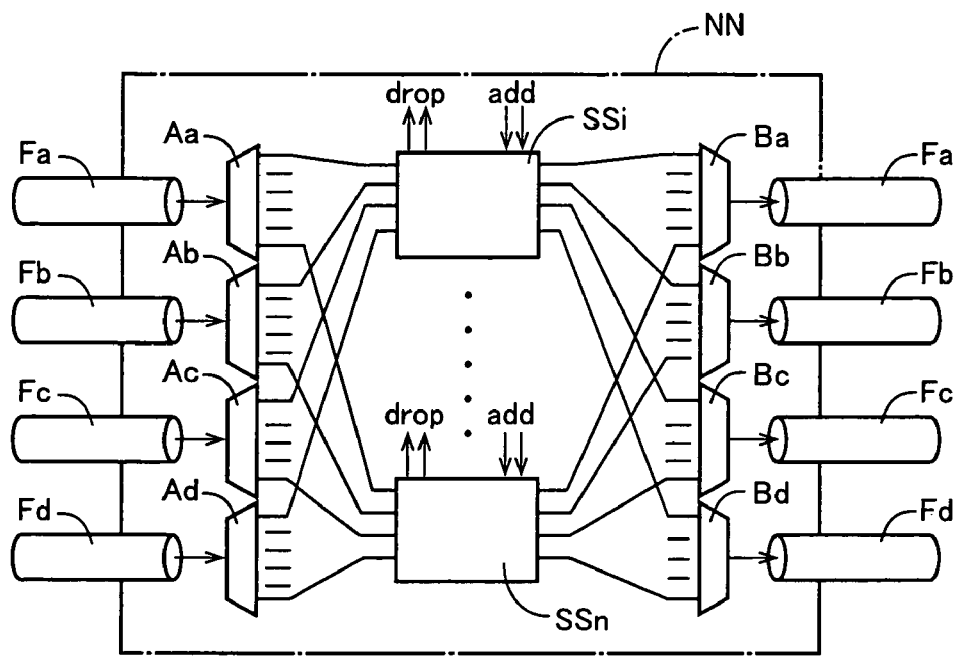
FIG. 12 is a diagram for explaining a configuration of a conventional node apparatus that concatenates a pair of optical rings basically making up a pair of optical networks.
Figure 13:
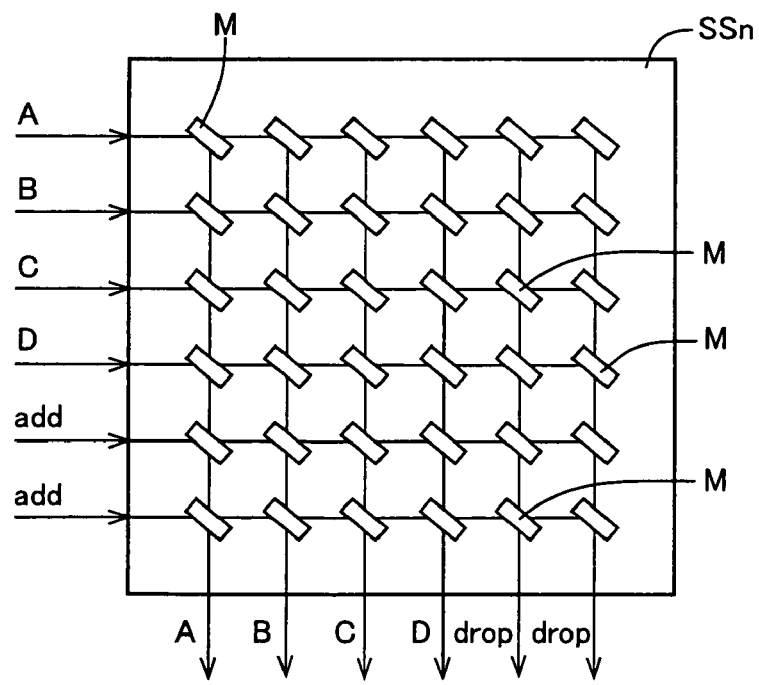
FIG. 13 is a diagram for explaining a configuration of a traffic switch apparatus on the basis of wavelength provided on the conventional node apparatus of FIG. 12 and an intra-ring and inter-ring traffic switch device on the basis of wavelength provided on the node apparatus of FIG. 11 when achieved by using two-dimensional MEMS switches.
Figure 14:
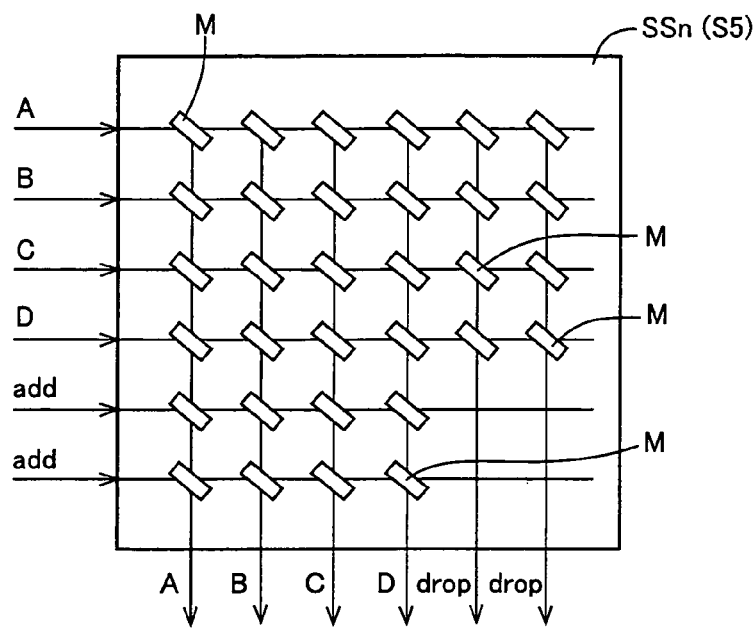
FIG. 14 is a diagram for explaining another exemplary configuration of the traffic switch apparatus on the basis of wavelength provided on the conventional node apparatus of FIG. 12 and the intra-ring and inter-ring traffic switch device on the basis of wavelength provided on the node apparatus of FIG. 11 when achieved by using two-dimensional MEMS switches.

FIGS. 12 and 13 depict a conventional example of bidirectionally concatenating a first optical ring R1 made up of a pair of annular optical fibers Fa, Fb and a second optical ring R2 made up of a pair of annular optical fibers Fc, Fd by a single node apparatus NN in a manner capable of arbitrarily routing all the wavelengths. In this case, set of 36 switch elements M is formed with four inputs and two add inputs from one ends of four annular optical fibers Fa, Fb, Fc, Fd and four outputs and two drop outputs to the other ends of the four optical fibers Fa, Fb, Fc, Fd and is required by the number of wavelength multiplexes. If the number of wavelength multiplexes is 96, a switch device SSn depicted in FIG. 12 is required by the number of wavelengths (n=96) and, as depicted by the diamond-shaped marks ◇ of FIG. 7, a switch device including a total of 3456 elements is required regardless of the inter-ring traffic rate. In the conventional example of FIG. 12 with the first optical ring R1 made up of a pair of the annular optical fibers Fa, Fb and the second optical ring R2 made up of a pair of the annular optical fibers Fc, Fd bidirectionally concatenated by the single node apparatus NN in a manner capable of arbitrarily routing all the wavelengths, four switches located at lower right positions for directly connecting a pair of adds and a pair of drops with each other may be omitted. In this case, the minimized configuration is as depicted in FIG. 14.

Third Embodiment

Figure 11:
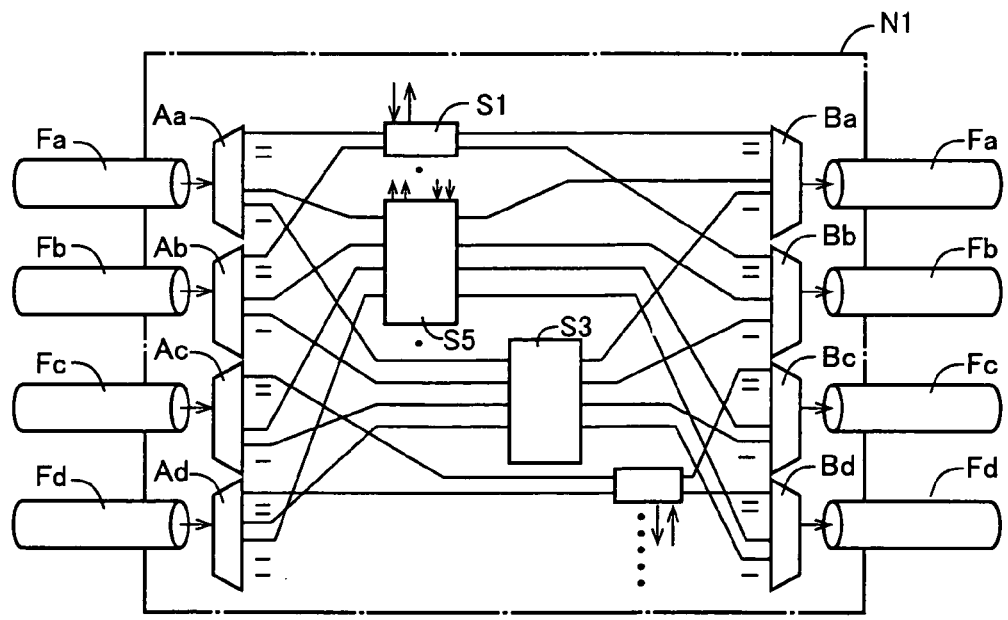
FIG. 11 is a diagram for explaining a relevant part of a configuration of a node apparatus according to another embodiment of the present invention.

FIG. 11 depicts another exemplary configuration of the one-layer node apparatus N1 depicted in FIG. 3. The node apparatus N1 of the embodiment is provided between one ends and the other ends of pairs of annular optical fibers Fa, Fb, Fc, Fd making up the first optical ring R1 and the second optical ring R2 and is common in that the apparatus includes a plurality of (in this embodiment, four) wavelength demultiplexers (demultiplexers) Aa, Ab, Ac, Ad that demultiplex for each wavelength and respectively output the wavelength multiplexed lights input respectively from the annular optical fibers Fa, Fb, Fc, Fd; a plurality of (in this embodiment, four) wavelength multiplexers (multiplexers) Ba, Bb, Bc, Bd that multiplex lights of wavelengths respectively input for transmission to the other ends of a pair of the annular optical fibers Fa, Fb or Fc, Fd to respectively output the lights to the other ends of a pair of the annular optical fibers Fa, Fb or Fc, Fd; a first intra-ring traffic switch device S1 for traffic control between one ends and the other ends of the two annular optical fibers Fa, Fb making up the first optical ring R1; a second intra-ring traffic switch device S2 for controlling the routing between one ends and the other ends of the two annular optical fibers Fc, Fd making up the second optical ring R2; and an inter-ring traffic switch device S3 for controlling a routing ring between one ends of the annular optical fibers Fa, Fb, Fc, Fd and the other ends of the annular optical fibers Fa, Fb, Fc, Fd to bidirectionally perform the intra-ring routing and the inter-ring routing.

However, the node apparatus N1 of the embodiment is different from that depicted in FIG. 3 in that an intra-ring and inter-ring traffic switch device S5 is included to perform each of the traffic control between one ends and the other ends of the two annular optical fibers Fa, Fb making up the first optical ring R1, the control of the routing between one ends and the other ends of the two annular optical fibers Fc, Fd making up the second optical ring R2, and the control of the routing ring between one ends of the annular optical fibers Fa, Fb, Fc, Fd and the other ends of the annular optical fibers Fa, Fb, Fc, Fd. The intra-ring and inter-ring traffic switch device S5 is configured as depicted in FIG. 13 or 14, for example.

In the node apparatus N1 depicted in FIG. 3 of the first embodiment, the inter-ring traffic rate $\alpha$ is a rate of the number of wavelengths preliminarily set for the inter-ring transmission to the number of all the wavelengths of the wavelength multiplexed light in the annular optical fibers Fa, Fb, Fc, Fd and is preliminarily set and used as 50%, for example. Although the setting of the rate $\alpha$ is determined in advance based on traffic prediction, etc., it is inevitable that the prediction is not necessarily consistent with the fact, resulting in a certain amount of error. However, since the node apparatus N1 depicted in FIG. 11 above includes the intra-ring and inter-ring traffic switch device S5 for performing each of the traffic control between one ends and the other ends of the two annular optical fibers Fa, Fb making up the first optical ring R1, the control of the routing between one ends and the other ends of the two annular optical fibers Fc, Fd making up the second optical ring R2, and the control of the routing ring between one ends of the annular optical fibers Fa, Fb, Fc, Fd and the other ends of the annular optical fibers Fa, Fb, Fc, Fd, the error may advantageously be absorbed. However, on the other hand, if the number of switches making up the intra-ring and inter-ring traffic switch device S5 increases, the switch reduction effect characteristically deteriorates.

Although the embodiments of the present invention have been described in detail with reference to the drawings, the present invention is implemented in other aspects.

Although, for example, the first optical ring R1 and the second optical ring R2 are made up of pairs of the annular optical fibers Fa, Fb and Fc, Fd, respectively, each ring may be made up of four fibers. In fact, at least two fibers may be included.

Although, for example, the four wavelength demultiplexers Aa, Ab, Ac, Ad are disposed correspondingly to one ends of the annular optical fibers Fa, Fb, Fc, Fd, the four demultiplexers may be integrated into one or two demultiplexers or may conversely be divided into 8 or 16 demultiplexers. In fact, the number is not important.

The node apparatus N2 of FIG. 8 may also perform the demultiplexing on the basis of a wavelength group in the intra-ring traffic.

The description is merely exemplary illustration and may suitably be changed as needed. Although not exemplary illustrated one by one, the present invention may variously be changed without departing from the spirit of the present invention.

The invention claimed is:

1. An optical communication network node apparatus in an optical communication network including a first optical ring and a second optical ring each having at least two annular optical fibers, the optical communication network node apparatus setting a transmission path of wavelength multiplexed light including a plurality of wavelengths within the first optical ring or the second optical ring and between the first optical ring and the second optical ring, the apparatus comprising:

a plurality of group demultiplexers that demultiplex for each wavelength group and respectively output the wavelength multiplexed lights respectively input from the pairs of the annular optical fibers;

a plurality of wavelength demultiplexers that demultiplex for each wavelength and respectively output an optical signal of a wavelength group containing only light of wavelength preliminarily set for the intra-ring transmission among the wavelength groups output from the plurality of the group demultiplexers;

a plurality of group multiplexers that multiplex lights of wavelength groups respectively input for transmission to the pairs of the annular optical fibers to respectively output the lights to the pairs of the annular optical fibers;

a plurality of wavelength multiplexers that multiplex lights of wavelengths respectively input for the intra-ring traffic into wavelength groups to respectively output the wavelength groups to the plurality of the group multiplexers;

a plurality of intra-ring traffic switch devices that branch/insert as needed and distribute lights of respective wavelengths respectively output from the plurality of the wavelength demultiplexers to the wavelength multiplexers performing output to the optical ring that has transmitted the light among the plurality of the wavelength multiplexers;

a plurality of inter-ring transmission wavelength group switch devices that respectively distribute to the plurality of the group multiplexers the wavelength groups containing only lights of wavelengths preliminarily set for the inter-ring transmission among a plurality of wavelength groups respectively output from the plurality of the group demultiplexers; and a type-mixed wavelength group multiplexing/demultiplexing device that demultiplexes a type-mixed wavelength group including wavelengths having mutually different traffic types of the inter-ring transmission among a plurality of wavelength groups respectively output from the plurality of the group demultiplexers into lights of respective wavelengths, the type-mixed-wavelength group multiplexing/demultiplexing device performing routing by using a switch device to multiplex and output new respective wavelength groups including lights of wavelengths having the same traffic types of the inter-ring transmission from the demultiplexed lights with multiplexers to the plurality of the wavelength group multiplexers through the inter-ring transmission wavelength group switch devices.

2. An optical communication network node apparatus in an optical communication network including N rings including a first optical ring and a second optical ring each having at least two annular optical fibers, the optical communication network node apparatus setting a transmission path of wavelength multiplexed light including a plurality of wavelengths within each of the rings and between the optical rings in the N rings, the apparatus comprising:

a plurality of group demultiplexers that demultiplex for each wavelength group and respectively output the wavelength multiplexed lights respectively input from the pairs of the annular optical fibers;

a plurality of wavelength demultiplexers that demultiplex for each wavelength and respectively output an optical signal of a wavelength group containing only light of wavelength preliminarily set for the intra-ring transmission among the wavelength groups output from the plurality of the group demultiplexers;

a plurality of group multiplexers that multiplex lights of wavelength groups respectively input for transmission to the pairs of the annular optical fibers to respectively output the lights to the pairs of the annular optical fibers;

a plurality of wavelength multiplexers that multiplex lights of wavelengths respectively input for the intra-ring traffic into wavelength groups to respectively output the wavelength groups to the plurality of the group multiplexers;

a plurality of intra-ring traffic switch devices that branch/insert as needed and distribute lights of respective wavelengths respectively output from the plurality of the wavelength demultiplexers to the wavelength multiplexers performing output to the optical ring that has transmitted the light among the plurality of the wavelength multiplexers;

a plurality of inter-ring transmission wavelength group switch devices that respectively distribute to the plurality of the group multiplexers the wavelength groups containing only lights of wavelengths preliminarily set for the inter-ring transmission among a plurality of wavelength groups respectively output from the plurality of the group demultiplexers; and a type-mixed wavelength group multiplexing/demultiplexing device that demultiplexes a type-mixed wavelength group including wavelengths having mutually different traffic types of the inter-ring transmission among a plurality of wavelength groups respectively output from the plurality of the group demultiplexers into lights of respective wavelengths, the type-mixed wavelength group multiplexing/demultiplexing device performing routing by using a switch device to multiplex and output new respective wavelength groups including lights of wavelengths having the same traffic types of the inter-ring transmission from the demultiplexed lights with multiplexers to the plurality of the wavelength group multiplexers through the inter-ring transmission wavelength group switch devices.

* * * * *